(12) United States Patent
Shanahan et al.

(10) Patent No.: US 7,356,187 B2
(45) Date of Patent: Apr. 8, 2008

(54) METHOD AND APPARATUS FOR ADJUSTING THE MODEL THRESHOLD OF A SUPPORT VECTOR MACHINE FOR TEXT CLASSIFICATION AND FILTERING

(75) Inventors: James G. Shanahan, Pittsburgh, PA (US); Norbert Roma, Pittsburgh, PA (US); David A. Evans, Pittsburgh, PA (US)

(73) Assignee: Clairvoyance Corporation, Pittsburgh, PA (US)

( * ) Notice: Subject to any disclaimer, the term of this patent is extended or adjusted under 35 U.S.C. 154(b) by 946 days.

(21) Appl. No.: 10/822,327

(22) Filed: Apr. 12, 2004

(65) Prior Publication Data

US 2005/0228783 A1 Oct. 13, 2005

(51) Int. Cl.
*G06K 9/62* (2006.01)
(52) U.S. Cl. ............... 382/224; 382/165; 382/170; 706/20
(58) Field of Classification Search ............... 382/125, 382/155, 157, 159, 165, 170, 180, 190, 224, 382/227; 706/12, 14, 20, 62; 707/1–3, 5, 707/100, 104.1; 709/218, 239
See application file for complete search history.

(56) References Cited

U.S. PATENT DOCUMENTS

| | | | | |
|---|---|---|---|---|
| 5,619,709 A | * | 4/1997 | Caid et al. | 715/532 |
| 5,907,840 A | * | 5/1999 | Evans | 707/5 |
| 5,999,925 A | | 12/1999 | Evans | |
| 6,115,706 A | | 9/2000 | Evans | |
| 6,205,443 B1 | | 3/2001 | Evans | |
| 6,327,581 B1 | | 12/2001 | Platt | |
| 6,377,947 B1 | * | 4/2002 | Evans | 707/5 |
| 6,430,559 B1 | | 8/2002 | Zhai | |
| 6,463,434 B2 | | 10/2002 | Zhai | |
| 6,535,876 B2 | | 3/2003 | Zhai | |
| 6,535,878 B1 | * | 3/2003 | Guedalia et al. | 707/8 |
| 6,587,850 B2 | * | 7/2003 | Zhai | 707/5 |

OTHER PUBLICATIONS

Arampatzis, Avi., Unbiased S-D Threshold Optimization, Initial Query Degradation, Decay, and Incrementality, for Adaptive Document Filtering, Tenth Text Retrieval Conference (TREC 2001), 2002, 596-605.
Zhang and J. Callan. "YFilter at TREC-9". In Proceedings of the Ninth Text Retrieval Conference (TREC-9), (pp. 135-140). National Institute of Standards and Technology, 2001, special publication 500-249).

(Continued)

*Primary Examiner*—Samir Ahmed
*Assistant Examiner*—Mehdi Rashidian
(74) *Attorney, Agent, or Firm*—Blaney Harper; Jones Day

(57) ABSTRACT

An information need can be modeled by a binary classifier such as support vector machine (SVM). SVMs can exhibit very conservative precision oriented behavior when modeling information needs. This conservative behavior can be overcome by adjusting the position of the hyperplane, the geometric representation of a SVM. The present invention describes a couple of automatic techniques for adjusting the position of an SVM model based upon a beta-gamma thresholding procedure, cross fold validation and retrofitting. This adjustment technique can also be applied to other types of learning strategies.

18 Claims, 12 Drawing Sheets

OTHER PUBLICATIONS

Yang, Yiming., A Study on Thresholding Strategies for Text Categorization, Proceedings of ACM SIGIR Conference on Research and Development in Information Retrieval (SIGIR '01), 2001, 137-145.

Ault, T., Yang Y., kNN, Rocchio and Metrics for Information Filtering at TREC-10, Tenth Text Retrieval Conference (TREC-2001), 2002, 84-93.

Shanahan, J.G., Roma, N., Improving SVM Text Classification Performance through Threshold Adjustment, European Conference on Machine Learning (ECML) 2003.

Cancedda, N. et al., Kernel Methods for Document Filtering, Eleventh Text Retrieval Conference (TREC-11), 2003.

Salton, et al., "A Vector Space Model For Automatic Indexing" Communications of the ACM vol. 18 No. 11 pp. 613-620, 1975.

* cited by examiner

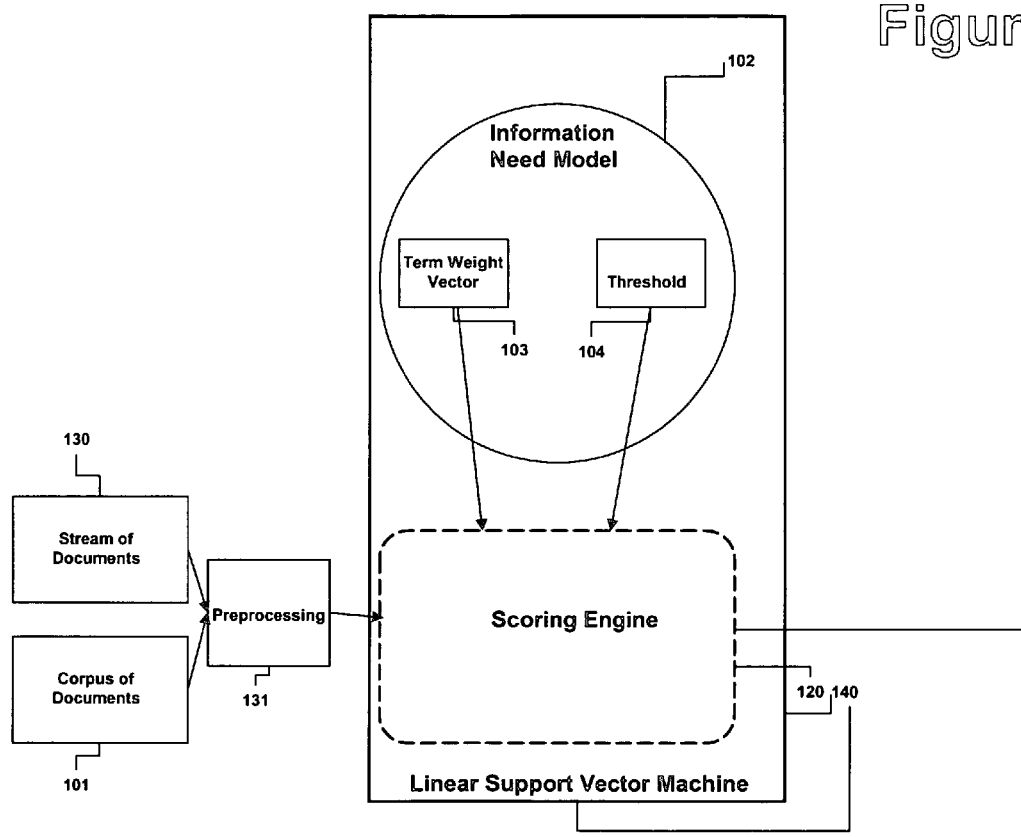

METHOD AND APPARATUS FOR ADJUSTING THE MODEL THRESHOLD OF A SUPPORT VECTOR MACHINE FOR TEXT CLASSIFICATION AND FILTERING

FIELD OF INVENTION

The present invention relates to the field of computerized information search and retrieval systems. It relates generally to a method and apparatus for determining whether an object containing textual information belongs to a particular category or categories. More specifically, this invention relates to a method and apparatus for setting and updating the threshold score of a learnt support vector machine model.

BACKGROUND OF THE INVENTION

Given the vast amount of information accessible by computer systems, particularly on distributed databases, more efficient methods of managing information are continually needed. One general type of information management is exemplified by information filtering. In information filtering, a system retrieves or presents to a user a limited number of documents (or information) that satisfies a user's requirements. In one form of information filtering, documents are processed in a stream or in batches as they are delivered to the system, perhaps continuously. In contrast to database searching, in which all the documents in the database are available at once and can be evaluated and ranked against one another before being presented to the user, in this form of filtering documents are evaluated by the system one at a time or in small sets and a binary decision to accept (i.e., present the document to the user in this case) or reject (i.e., do not present the document to the user) a document is made for each individual document. In document filtering it is often the case that an information need is not expressed directly, but rather is presented to the system as a set of example documents that either satisfy or that do not satisfy the information need. This set can be regarded as representing a topic or category or class. The system must process this set of documents to derive an information need model. Typically, information needs can be represented as a binary document classifier model that can be learned from both the positive and negative examples. When making a filtering decision, the system compares the information in a document with the information contained in the derived (also referred to as the learnt) information model, which serves to represent the user's need or topic. In the literature, information filtering is also commonly known as text classification. In this disclosure we use the term information need to characterize both information filtering and text classification, where the user of the system can be a human or another computer system.

Information needs can be represented computationally using a variety of representations known as models. Generally, the information management system characterizes computationally a document and information need model using a vector space representation. Additional background relating to the generation of vector space models is disclosed in U.S. Pat. No. 5,619,709, incorporated herein by reference and by Salton et al., in "A Vector Space Model For Information Retrieval", Journal of the ASIS, 18:11, 613-620, November 1975.

Under the vector-space representation, documents can be conceptually viewed as a list of tuples (also known as a vector of features). The document vector D consists of a list of tuples of the form $<f_i, w_i>$, where $f_i$ denotes a feature (such as a word, a noun phrase, or any linguistically or otherwise derived feature) and $w_i$ denotes the weight associated with feature $f_i$. Here, the weight value $w_i$ can be simply a binary value where a value of 1 denotes that the feature occurred in the document and a value of 0 denotes that the feature has not occurred in the document. Alternative weighting schemes, such as TF_IDF, which will be presented below, can also be used. Information needs can also be represented using a vector space representation.

Modeling information needs using automatic techniques is a very active area of research and application in information management. Recently, support vector machines (SVMs), which provide excellent performance on a variety of learning problems including handwritten character recognition, face detection, have been applied to modeling information needs. Their performance for modeling information needs, while being competitive with other approaches (e.g., Rocchio, naïve Bayes) from a precision perspective, is not competitive from a recall perspective.

An SVM model can be viewed geometrically as a hyperplane (or hypersurface) that partitions two classes of objects in a multi-dimensional feature space into two disjoint subsets; in our case the hyperplane partitions documents into a positive set corresponding to documents that satisfy an information need and into a negative set corresponding to documents that do not satisfy an information need. Mathematically, a linear SVM (non-linear SVMs will be presented subsequently) can be represented in the following two equivalent forms: using a weight vector representation; or using a support vector representation. The weight vector representation mathematically represents an SVM (the separating hyperplane) as a pair of parameters $<W, b>$, where W denotes a weight vector and b represents a threshold or bias term. The weight vector W consists of a list of tuples of the form $<f_i, w_i>$, where $f_i$ denotes a feature and $w_i$ denotes the weight associated with feature $f_i$. This corresponds to a vector space representation of the weight vector W. Here, the weight value $w_i$ associated with each feature $f_i$ and the threshold value b are learned from examples using standard SVM learning algorithms. This weight vector representation is also known as the primal representation. The support vector representation of an SVM model, also known as the dual representation, mathematically represents an SVM (the separating hyperplane) as a pair of parameters $<SV, b>$, where SV denotes a list of example tuples, known as support vectors, and b represents a threshold. The support vector list consists of tuples of the form $<SV_i, \alpha_i>$, where $SV_i$ denotes an example document with known classification and $\alpha_i$ denotes the weight associated with example $SV_i$. The Euclidean (perpendicular) distance from the hyperplane to the support vectors is known as the margin of the support vector machine.

The parameters of the support vector machine model are determined using a learning algorithm in conjunction with a training data set that characterizes the information need, i.e., a list of documents that have been labeled as positive or negative. Some of these training algorithms are discussed below. Abstractly, learning a linear SVM model reduces to determining the position and orientation of the hyperplane that separates the positive examples and negative examples that are used during learning. This reduces to determining the parameters of the weight vector representation or the support vector representation. Learning a support vector machine can be viewed both as a constraint satisfaction and optimization algorithm, where the first objective is to determine a hyperplane that classifies each labeled training example correctly, and where the second objective is to determine the hyperplane that is furthest from training data. Classifying an example using an SVM model reduces to determining which side of the hyperplane the example falls. If the example falls on the positive side of the hyperplane then the example is assigned a positive label; otherwise it is assigned a negative label. This form of learnt SVM is known as a hard SVM. Other flavors of SVM exist which relax the first objective. For example, not requiring all training examples to be classified correctly by the SVM leads to a flavor known as soft SVMs. In this case the SVM learning algorithm trades-off accuracy of the model with the margin of the model. Other types of SVMs and SVM learning algorithms also exist, some of which are discussed below.

Theoretically, generalization error of SVMs (the error of a model on unseen data) can be upper-bounded as a function of the margin, the distance from the nearest data points (known as the support vectors) to the separating decision surface (hyperplane). As a result SVM learning algorithms focus on finding the model that maximizes the margin. This approach to model selection is entirely data driven and provides state-of-the-art performance in dense data problems. However, in domains such as modeling information needs, that are sparse and where classes are unevenly distributed and poorly represented, this approach to learning can lead to an over fitting of the more frequent class. In other words, these learning algorithms lead to models with excellent precision but poor recall. Various approaches, known as relaxation approaches, have been proposed to counter this problem. These approaches can be characterized as follows: those that embed the relaxation strategy within the learning algorithm; those that treat relaxation as a wrapper around the learning step; and those that view relaxation as a post-learning thresholding step. We examine each category here highlighting its main characteristics, its strengths and its weaknesses.

Embedded relaxation strategies build on soft SVMs (SVM models that balance low error rate with large margin), whereby different or asymmetric costs are associated with false negatives and false positives. To counter the imbalance of positive training documents to negative training documents, a higher cost is associated with the misclassification of positive documents than with negative documents thereby resulting in an SVM model that balances the tradeoff between large margin and few errors (in particular, few positive misclassifications). This generally results in a hyperplane that is different in orientation and position than the separating hyperplane resulting from a hard SVM formulation. Tuning the misclassification cost asymmetrically can provide significant improvement, though this process can be prohibitively expensive.

A second generic approach for relaxation is done outside the learning step but uses the learning algorithm as the evaluation function to choose between different levels of relaxation. This category subsumes uneven margin-based learning e.g., using positive and negative margins. The degree of the positive and negative margin is empirically determined using cross validation from a set of possible margins. Uneven margin based learning results in separating hyperplanes that have different orientation and position to the hyperplane resulting from a standard hard or soft SVM learning algorithm. Uneven margin-based learning has, to date, been limited to text document routing/ranking problems. Within this application field it has yielded a state-of-the-art performance. This approach to relaxation can also prove to be expensive, as training is composed of cross validation, where each cross validation step requires the training of a separate SVM, and a final SVM training step (that uses the cross validation determined margin settings).

The final relaxation category involves strategies that are applied after the SVM model has been learned. This category of approaches is based on thresholding the output value (or margin) of the learnt SVM. This is generally an inexpensive one-dimensional optimization problem that can lead to significant improvement in performance measures. This approach results in changing the position (or a translation) of the separating hyperplane but does not change the orientation of the hyperplane (that results from hard or soft SVM learning). It should be noted that this thresholding step is generic in nature. Therefore, we can replace our SVM, as a core model, with any of a number of popular types of information model, such as Rocchio models, or probabilistic models, whose outputs are document scores and probabilities, respectively.

The critical step in thresholding is to determine the value, known as the threshold, at which a decision changes from labeling a document as positive to labeling a document as negative with respect to an information need. Many of the approaches to thresholding that have been developed in other fields and for other purposes, such as information retrieval (IR), can be applied directly in thresholding the score output of SVMs. Though thresholding has received a lot attention in the IR sub-field of adaptive filtering, optimizing thresholds remains a challenging problem. The main challenge arises from a lack of labeled training data. Due to limited amounts of training data, standard approaches to IR modeling use the same data for both model fitting (learning) and threshold optimization. Consequently, this often biases the threshold to high precision, i.e., the threshold overfits the training data. A beta-gamma thresholding algorithm, proposed to counter this problem, and its background are described in greater detail in U.S. Pat. Nos. 6,430,559, 6,463,434, 6,535,876, and 6,587,850, which are herein incorporated by reference. Other approaches have also been used. Yang proposed and presented various score-based thresholding algorithms for text categorization (See, e.g., the article, Yang Y., A study on thresholding strategies for text categorization, Proceedings of ACM SIGIR Conference on Research and Development in Information Retrieval (SIGIR'01), 2001, 137-145). Zhang and Callan presented a maximum likelihood estimation of filtering thresholds. (Y. Zhang and J. Callan. "YFilter at TREC-9". In Proceedings of the Ninth Text REtrieval Conference (TREC-9), (pp. 135-140). National Institute of Standards and Technology, 2001, special publication 500-249). Arampatzis proposed a score-distributional-based threshold optimization algorithm (See, e.g., the article, Arampatzis A., Unbiased S-D Threshold Optimization, Initial Query Degradation, Decay, and Incrementality, for Adaptive Document Filtering, Tenth Text Retrieval Conference (TREC-2001), 2002, 596-605). Ault and Yang proposed a margin-based local regression for predicting optimal thresholds for adaptive filtering (See, e.g., the article, Ault T., Yang Y., kNN, Rocchio and Metrics for Information Filtering at TREC-10, Tenth Text Retrieval Conference (TREC-2001), 2002, 84-93).

Some of these IR approaches have been adapted already for adjusting the threshold of an SVM. For example, Cancedda et al. (See, e.g., the article, Cancedda N. et al., Kernel Methods for Document Filtering, Eleventh Text Retrieval Conference (TREC-11), 2003) report one such approach to adjusting the threshold of SVMs based upon a Gaussian modeling process of the SVM scores (output values) for positive and negative documents for each category. This Gaussian model is then used to generate sample document scores and an optimal threshold is set to the score corresponding to optimal utility. This approach, combined with asymmetric learning, has led to huge improvements in recall and precision, though it is hard to discern how much improvement can be attributed to the asymmetric cost learning strategy or to the thresholding strategy.

The advantage of using thresholding in combination with SVMs is that a user utility model can be naturally incorporated into the learning phase. Being able to incorporate a utility model into learning has been demonstrated to improve system performance as measured in terms of standard information retrieval measures (See, e.g., the article, Shanahan J. G., Roma N., Improving SVM Text Classification Performance through Threshold Adjustment, European Conference on Machine Learning (ECML) 2003).

It would therefore be advantageous to develop alternative threshold adjustment schemes for boosting the performance of SVMs that incorporates utility models.

SUMMARY OF THE INVENTION

In document filtering, typically, an information need can be represented as a binary document classifier model that can be learned from labeled example documents that either satisfy the information need (labeled as positive) or not (labeled as negative). Support vector machines (SVMs) serve as a very useful computational model of an information need. An SVM model can be viewed geometrically as a hyperplane (or hypersurface) that partitions two classes of objects in a multi-dimensional feature space into two disjoint subsets; in our case the hyperplane partitions documents into a positive region corresponding to documents that satisfy an information need and into a negative region corresponding to documents that do not satisfy an information need. Since the guiding criteria for learning an SVM model from labeled examples is to find the hyperplane that is furthest from the training data, while, in general, ignoring users requirements and the idiosyncrasies of text data (training data for text filtering tends to be biased to one class, i.e., have few positive examples and lots of negative examples), learning results in a conservative hyperplane model. The learnt model tends to exhibits high precision, but very low recall.

It is highly desirable to have a principled and automatic method for deciding how best to create an SVM model that is not too conservative and that accommodates a model of the user expectations. Empirical studies have shown this can be achieved by translating the hyperplane. One of the simplest ways of attaining this is to reset the threshold parameter associated with the learnt SVM in a principled manner that incorporates a user model.

In accordance with the invention, there is provided a method for setting/resetting the threshold of an SVM model. In order to set the threshold, a set of labeled documents, a user utility model, and a trained SVM are required. This proposed method exploits the excellent ranking ability of SVMs in conjunction with cross validation as means of adjusting the threshold. The threshold of the SVM, during training, is expressed abstractly in terms of an interval and two parameters beta and gamma, which form an integral part of the beta-gamma thresholding procedure. Within this framework each labeled training document is classified using the SVM model, thus yielding a margin value (distance from the separating hyperplane). The labeled training documents are then ranked/sorted in order of decreasing margin value. The degree of satisfaction of a user with respect to an information need for the classified training documents may be expressed by a utility measure. Assuming each labeled document's margin could be a possible threshold for the SVM model, a utility can be computed for each candidate threshold. Using the utilities at each candidate threshold, the point of highest utility and the point of zero utility are determined. A threshold for the SVM model is then calculated by interpolating/extrapolating between the margin associated with the highest utility and the margin associated with the zero utility. The degree of interpolation/extrapolation with respect to this interval is determined using a variety of approaches disclosed herein known as the discrete and continuous threshold adjustment algorithms. In addition, alternative approaches to determining the interval used in beta-gamma thresholding are disclosed. The newly calculated threshold value is subsequently used in collaboration with the SVM model for categorizing or filtering a text object. In an alternative embodiment, the SVM-based core model of an information need can be substituted with an alternative model such as a traditional information retrieval model.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

Figure 1A:
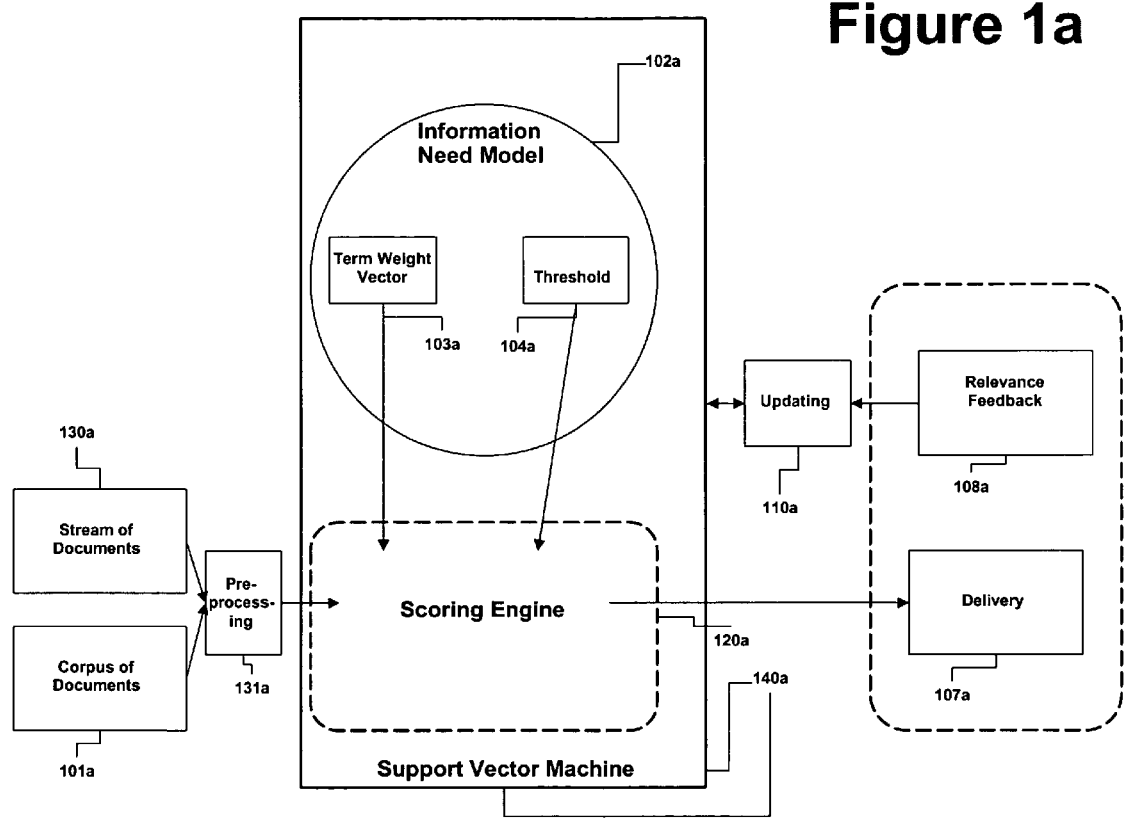
FIG. 1 is a flow chart that illustrates a method according to the present invention for filtering relevant information from a corpus or a stream of documents using a support vector machine (SVM).

In document filtering it is often the case that an information need is not expressed directly, as would be the case in a query to an information-retrieval system, but rather is presented to the system as a set of example documents that either satisfy or that do not satisfy the information need. This set can be regarded as representing a topic or category or class. The system must process this set of documents to derive an information need model. Typically, information needs can be represented as a binary document classifier model that can be learned from both the positive and negative examples.

The approach to filtering information in accordance with the invention involves the construction of any model (statistical or mathematical), such as, a support vector machine or a probabilistic model from labeled examples, where one step in the construction process uses either of the disclosed threshold setting mechanisms referred to as discrete thresholding and continuous thresholding as a means of setting the threshold for the model. The present invention also concerns determining if a document belongs to a category or class (or satisfies an information need) using the constructed model.

Though the disclosed thresholding approaches can be used generically with a variety of machine learning approaches and in addition can be applied to a variety of problem domains, in this patent we illustrate the disclosed approaches in conjunction with two machine learning approaches; those of support vector machine and traditional information retrieval filters. The approaches are further elucidated with special application to modeling information needs in the context of text classification and filtering.

FIG. 1 illustrates the general method for filtering relevant information from a corpus of documents 101 or from a steam of documents 130, where the information need is modeled by a support vector machine 140. In one form of information filtering, documents are processed in a stream or in batches as they are delivered to the system, perhaps continuously. Here, the information need is represented as a binary document classifier model (a linear SVM) 140 that is learned from both the positive and negative examples that represent the information need. An SVM model 201 can be viewed geometrically as a hyperplane 210 (or hypersurface) that partitions two classes of objects in a multi-dimensional feature space into two disjoint subsets; in our case the hyperplane partitions documents into a positive region 240 corresponding to documents that satisfy an information need and into a negative region 241 corresponding to documents that do not satisfy an information need. When making a filtering decision, the SVM system 140 compares the information in a document with the information contained in the derived (also referred to as the learnt) information model (the term weight vector 103 and the threshold 104), which serves to represent the user's need or topic. If a new/unlabeled document falls on the positive side of the hyperplane the document is accepted, otherwise it is rejected as not satisfying the information.

According to one embodiment of the invention, a document is a text file containing one or more strings of characters or other symbols that are used to form more complex constructs. For example, strings of characters may form words, phrases, sentences, and paragraphs. The constructs contained in the documents are not limited to constructs or forms associated with any particular language. Furthermore, the feature types that may be used are not limited to linguistic strings or symbols, but can include other feature types such as: structural features, such as the number of fields or sections or paragraphs or tables in the document; physical features, such as the ratio of "white" to "dark" areas or the color patterns in an image of the document; annotation features, the presence or absence or the value of annotations recorded on the document in specific fields or as the result of human or machine processing; derived features, such as those resulting from transformation functions such as latent semantic analysis and combinations of other features; and many other feature types that may be apparent to practitioners of the art.

Documents are pre-processed 131 to insure that the features of the documents have been identified and are in a form that the model 140 can interpret. Many alternative techniques are known in the art for extracting and representing features, as well as for storing the features for efficient access by the system (as would be the case in an inverted index to a database of documents) or for sorting or ranking features for efficient processing. In the preferred embodiment, the documents in the corpus of documents 101 or stream 130 are processed one document at a time. For each document, features are extracted so as to obtain a term vector. In an alternative embodiment, the corpus of document 101 can be segmented into small subsets of documents or the stream of documents 130 can be collected or buffered to form a subset of documents. Such subsets of documents can be processed together to increase efficiency. Such subsets can also be used to define new super-document units for processing, for example, reflecting those documents within a set that share specific characteristics, such as being on the same topic. Practitioners of the art can readily appreciate the many alternative strategies and techniques one might use to establish such super-document groups. Furthermore, any document can be analyzed into sub-documents using the methods of U.S. Pat. Nos. 5,907,840, 5,999,925, 6,115,706, 6,205,443, and 6,377,947, which are herein incorporated by reference, and each sub-document of the document can be processed such that the features of one or more of the sub-documents of the document are used by the filter to score the document.

In this invention, a document for the purposes of processing can be defined as a literal document, as made available to the system as a source document; sub-documents of arbitrary size; collections of sub-documents, whether derived from a single source document or many source documents, that are processed as a single entity (document); and collections or groups of documents, possibly mixed with sub-documents, that are processed as a single entity (document); and combinations of any of the above.

In a preferred embodiment, the filtering system characterizes computationally a document or a support vector machine 140 using a vector space representation. Additional background relating to the generation of vector space models is disclosed in U.S. Pat. No. 5,619,709, incorporated by reference.

Under the vector-space representation, documents can be conceptually viewed as vectors of features, such as words, noun phrases, and other linguistically derived features (e.g., parse tree features). Typically a feature extraction module 131 transforms a document into its vector of features, $D=<\text{feature}_1/f_1, \ldots, \text{feature}_n/f_n>$, where each $f_i$ denotes the statistical importance (normalized) of feature $\text{feature}_i$. One common way to compute each weight $f_i$ associated for document Doc is as follows:

$$f_i = \text{freq}(f_i, \text{Doc}) \cdot idf(f_i)$$

where $\text{freq}(f_i, \text{Doc})$ represents the frequency of feature $f_i$, in document Doc and $idf(f_i)$ represents the log of the inverse of the distribution count of $f_i$, across all the available units (e.g., documents) that have been processed. The idf($f_i$) factor corresponds to the content discriminating power of the $i^{th}$ feature: i.e., a feature that appears rarely in a collection has a high idf value. The –idf($f_i$) factor is calculated as follows:

$$idf(f_i) = \log_2(N/n_{fi}) + 1$$

where N is the count of documents in the set and $n_{fi}$ is the count of the documents in which $i^{th}$ feature $f_i$ occurs.

Typically, a normalized document vector, D=<$nf_1$, ..., $nf_n$> is used in the vector space model of information filtering, where each $n_{fi}$ is obtained as:

$$nf_i = \frac{f_i}{\sqrt{\sum_{j=1}^{n} (f_j)^2}}.$$

This vector space representation is known as the TF_IDF representation. Similarly, under the vector-space representation, linear SVM information needs can be conceptually viewed as vectors of features, such as words, noun phrases, and other linguistically derived features (e.g., parse tree features). The weights associated with SVM information need models are derived using learning algorithms that outlined below.

Figure 2:
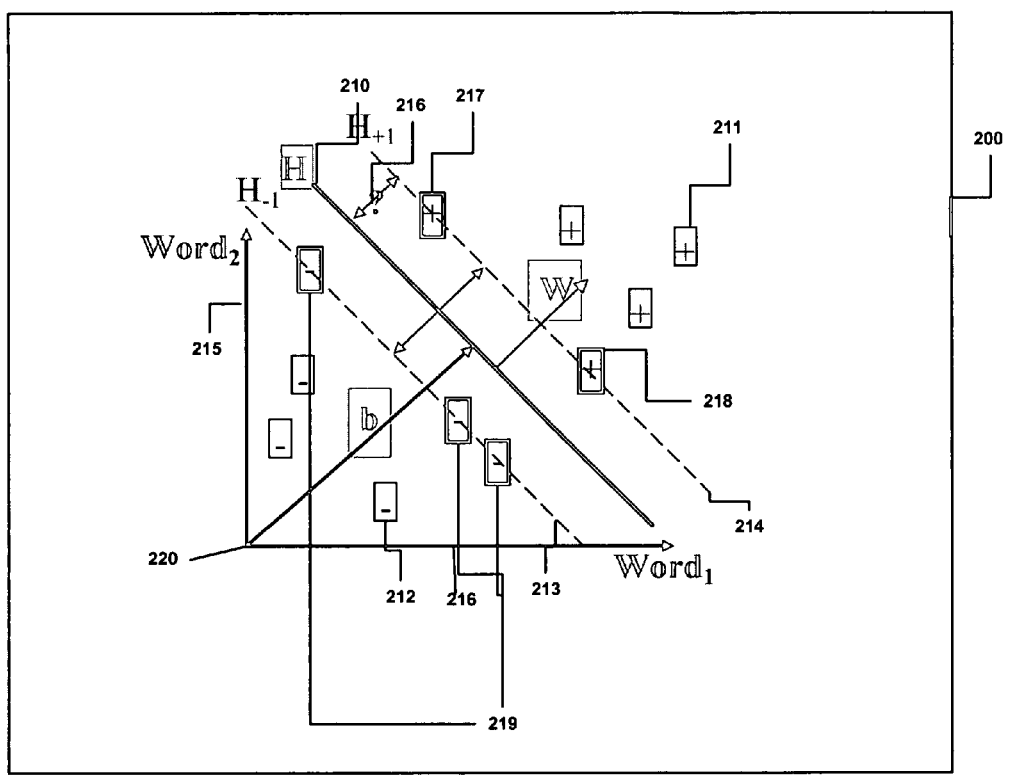
FIG. 2 depicts an SVM in a two-dimensional input space, Word1×Word2, denoted by the hyperplane, H, which is mathematically represented as $<W, X>+b=0$. Each training example document is associated with a category, ("+" or "−"). The support vectors correspond to the examples on the hyperplanes $H_{+1}$ and $H_{-1}$.
Figure 2A:
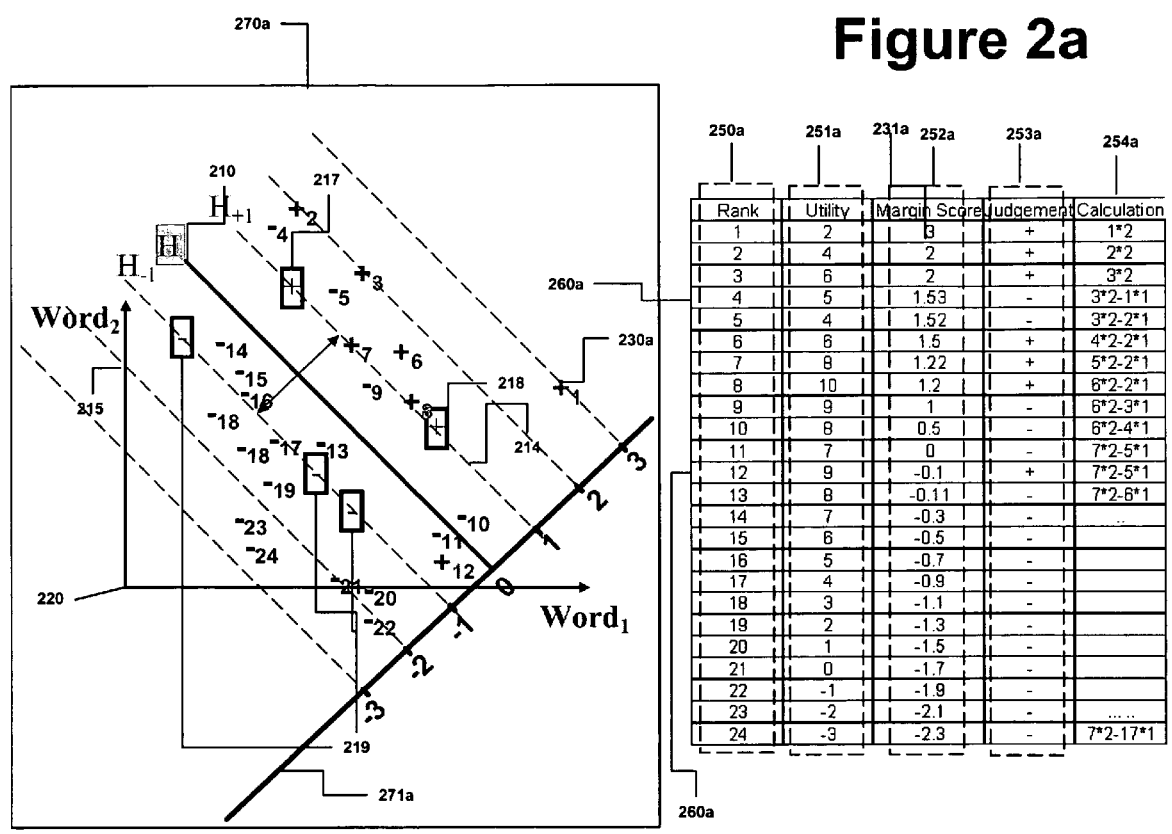
FIG. 2a presents an SVM in a two-dimensional input space, Word1×Word2, denoted by the hyperplane, H, which is mathematically represented as $<W, X>+b=0$. Training example documents are also presented. Each training example is associated with a category, ("+" or "−"), a margin score, a utility value, a rank and calculation details of the utility at each rank. This information is presented in tabular format (and in graphical format where appropriate).

Information needs, be they human-centric (information filtering) or machine-centric (text classification), can be represented computationally using a variety of representations known as models. A preferred embodiment for modeling information needs is support vector machines (SVM). Generally, SVMs are well known in the art. A support vector machine 201 can be viewed geometrically as a hyperplane 210 (or hypersurface) that partitions two classes of objects in a multi-dimensional feature space into two disjoint subsets. This separating hyperplane 210, in its simplest form, can be represented using a weight vector representation. The weight vector representation mathematically represents an SVM as a pair of parameters <W, b>, where W 103 denotes a weight vector and b 104 (230) represents a threshold. The weight vector W (230) consists of a list of tuples of the form <$f_i$, $w_i$>, where $f_i$ denotes a feature and $w_i$ denotes the weight associated with feature $f_i$. This corresponds to a vector space representation of the weight vector W. Here, the weight values $w_i$ and threshold value b are learned from examples using standard SVM learning algorithms. This weight vector representation is known as the primal representation of an SVM. FIG. 2 geometrically depicts an SVM model, i.e., a hyperplane 210 that separates a set of positive examples (belonging to the positive class, corresponding to documents that satisfy an information need) from a set of negative examples (negative class, i.e., documents that do not satisfy an information need). The hyperplane model in FIG. 2 corresponds to a hypothetical two-dimensional text problem, where H 210 is a hyperplane that separates positive class examples (denoted by "+"; 211 denotes a positive example) and negative class examples (denoted by "–"; 212 denotes a negative example). The x-axis 216 could correspond to the TF-IDF value, as defined below, of the feature $Word_1$. The y-axis 215 could be defined similarly for the feature $Word_2$. Mathematically a hyperplane 210 can be represented as follows:

$$\left(\sum_{i=1}^{n} w_i x_i\right) + b = 0 \quad (1)$$

where $w_i$ corresponds to the weight of feature $feature_i$ in the SVM model, $x_i$ corresponds to the value of the $feature_i$ in a document to be classified, b is the scoring threshold, and n represents the number of input variables or features. In the case of text, this can be viewed as the number of words (or phrases, etc.) that are used to represent a document. This can be written more succinctly in vector format as <W,X>+b=0, where <.> denotes the dot product or inner product as defined above, where W is a weight vector and corresponds to the normal vector 230 to the separating hyperplane, H 210, where X is an input vector or document and where b denotes the perpendicular distance from the hyperplane, H 210, to the origin 220. The parameter b is sometimes also known as the bias or threshold term for a hyperplane. For ease of presentation, the discussion of SVMs is limited to linear SVMs. Linear SVMs are typically represented using the tuple <W, b>, where W and b are as defined above.

The classification rule for an unlabeled document, X, using a linear support vector machine with separating hyperplane (W. b), is as follows:

$$\text{Class}(X) = \begin{array}{l} +1 \text{ if } (\langle W, X \rangle + b) \geq 0 \\ -1 \quad \text{Otherwise} \end{array}$$

where the dot product operation <.> is defined as above. Alternatively a normalized version of the dot product can be used and is defined as follows:

$$\langle W, X \rangle = \frac{W \cdot X}{|W| \cdot |X|} = \frac{\sum_{k=1}^{t} (w_k \cdot x_k)}{\sqrt{\sum_{k=1}^{t} w_k^2} \cdot \sqrt{\sum_{k=1}^{t} x_k^2}}$$

This can be written more succinctly using the Sign(.) function as follows:

$$\text{Class}(X) = f(X) = \text{Sign}(\langle W, X \rangle + b)$$

The SVM classification technique can be illustrated using the following SVM model and sample set of documents. This example assumes that each document is represented in terms of single word features such as dog, cat, etc.

| Terms | M | $D_1$ | $D_2$ |
|---|---|---|---|
| dog | −1 | 2 | — |
| cat | 1 | — | 1 |
| hat | −1 | 1 | — |
| bat | 1 | — | — |
| mat | 1 | — | — |
| hut | 0 | 2 | — |
| cut | 0 | — | 2 |
| luck | 0 | 3 | 3 |
| buck | 0 | 1 | — |
| b | 0.2 | — | — |

In this table, the Terms column lists a unique union of all the terms contained in the two documents $D_1$ and $D_2$. The values listed under $D_1$ and $D_2$ refer to the frequency of those terms as they appear in the documents. The idf of each feature is set to 1 (one) in this case. The values listed under M refer to the weights of the terms as they appear in the learnt SVM model corresponding to an information need. The classification of document D, with respect to the SVM model M is computed as follows:

$$<M, D_1> +0.2 = \frac{(-1\cdot 2)+(-1\cdot 2)}{\sqrt{1^2+1^2+1^2+1^2+1^2}\cdot \sqrt{2^2+1^2+2^2+3^2+1^2}}+$$

$$0.2 = -0.41 + 0.2 = -0.21$$

The output margin score of document D, is less than zero, therefore its classification is negative (i.e., does not satisfy the information need). Similarly, the output margin score of the SVM model M for document $D_2$ is computed as: S(M, $D_2$)=0.32. In this case document $D_2$ is classified as positive denoting that it satisfies the information need.

SVMs are typically acquired through a process of learning from labeled examples. In a text filtering scenario the labeled examples correspond to documents that express the information need. Generally, these examples are labeled as positive or negative examples. Mathematically, an example is represented as a tuple <X, y>, where X is a feature vector (as described earlier) and y denotes the classification of X. y can assume either +1 (i.e., the document X belongs to the positive class, corresponding to a document that satisfies an information need) or −1 value. FIG. 2 depicts a hypothetical two-dimensional example of an SVM learning problem. Here positive class examples are depicted by "+" (211 denotes an example positive document) and negative class examples are depicted by "−" (212 denotes a negative example). Training examples are presented to the SVM learning algorithm. Learning results in a hyperplane <W, b> 210. The distance from the hyperplane 210 to the nearest positive (e.g., 217) or negative examples is known as the margin 216 of the SVM.

Learning a linear SVM can be simply characterized as searching for a hyperplane (i.e., the weight and bias values) that separates the data with the largest margin. As a result, learning for linearly separable data can be viewed as the following optimization problem:

$$\min(W,b) = 0.5 \times \|w\|^2 \qquad (2)$$

$$\text{subject to: } y_i(\langle W,X_i\rangle + b) \geq 1 \forall i=1,\ldots,L \qquad (3)$$

where $X_i$ is a training example with label $y_i$ and $\|W\|$ is the Euclidean length of the weight vector (i.e., $\|W\| = \sqrt{(w_1)^2 + \ldots + (w_n)^2}$). L denotes the number of training examples. The nearest examples to the hyperplane 210 after learning correspond to the support vectors 217, 218 (positive class support vectors), 219 (negative class support vectors). The hyperplane corresponding to the learnt SVM can be equivalently be characterized in terms of support vectors as follows:

$$\text{Class}(X) = \text{Sign}\left(\sum_{i=1}^{|SV|} \alpha_i y_i \langle X, X_i\rangle + b\right)$$

where |SV| denotes the number of support vectors and i is the index over the support vectors, and $\alpha_i$ denotes the Lagrange multiplier associated with support vector $X_i$ ($\alpha_i$ can be viewed intuitively as the weight of importance of support vector $X_i$ to the separating hyperplane.). This is often referred to as the dual space representation of SVMs, whereas the weight vector representation <W, b> is referred to as the primal representation.

Using this dual representation, a dual learning problem for SVMs can be characterized as follows to determine this maximal margin hyperplane (i.e., the hyperplane that is furthest from the data) in this dual format (yielding the same solution as the primal problem):

$$\underset{\alpha \in R^L}{\text{minimize }} L(\alpha) = -\sum_{i=1}^{L}\alpha_i + \frac{1}{2}\sum_{i=1}^{L}\sum_{j=1}^{L}y_i y_j \alpha_i \alpha_j \langle X_i, X_j\rangle$$

subject to $\alpha_i \geq 0 \quad \forall i = 1, \ldots, L$ and $$\sum_{i=1}^{L} \alpha_i y_i = 0 \qquad |\alpha| \text{ is bounded by } \left(\frac{2R}{\gamma}\right)^2$$

In the case of non-linear separability (i.e., a hyperplane is insufficient for dividing the two classes), two alternative formulations have been proposed: one is based upon slack variables; and the other is based upon using non-linear kernels. The slack variable or soft formulation of SVM learning allows, but penalizes, examples that fall on the wrong side of the supporting hyperplanes (see $H_{+1}$ 214 and $H_{-1}$ 213), i.e., false positives or false negatives.

More formally a slack variable, $\xi_i$ (pronounced "xi"), is a variable associated with a training example ($X_i$, $y_i$), whose value is calculated as follows with respect to a hyperplane (W, b) and a target margin $\gamma$ (which has a fixed positive value):

$$\epsilon_i = \max(0, \gamma - y_i(\langle W, X_i\rangle) + b) \qquad (4)$$

Intuitively, this quantity measures how much a training data point fails to have a margin $\gamma$ from the hyperplane (W, b). In order to accommodate errors, we need to make minor modifications to our maximal margin hyperplane quadratic programming (QP) problem (outlined above). A nonnegative slack or error variable ai is added to each constraint and is also added as a weighted penalty term in the objective function, resulting in the following soft margin SVM quadratic programming problem (in primal form):

$$\min(W, b) = 0.5 \times \|w\|^2 + C \sum_{i=1}^{L} \xi_i \qquad (5)$$

subject to: $y_i(\langle W, X_i\rangle + b) + \xi_i \geq 1 \forall i=1, \ldots, L$ and
$\xi_i \geq 0 \forall i=1, \ldots, L \qquad (6)$ The C factor in the equation above is a parameter that allows one to trade off training error versus model complexity. A small value of C will lead to a higher number of training errors, while a large value of C will lead to behavior similar to that of hard SVMs. The Lagrange dual of this optimization problem is as follows:

$$\underset{\alpha \in R^L}{\text{minimize }} L(\alpha) = -\sum_{i=1}^{L}\alpha_i + \frac{1}{2}\sum_{i=1}^{L}\sum_{j=1}^{L}y_i y_j \alpha_i \alpha_j \langle X_i, X_j\rangle \qquad (7)$$

subject to $C \geq \alpha_i \geq 0 \quad \forall i = 1, \ldots, L$ and $$\sum_{i=1}^{L} \alpha_i y_i = 0 \qquad (8)$$

Different or asymmetric costs can be associated with false negatives and false positives.

As is known from mathematical programming literature, and in practice, learning SVMs is more efficiently conducted in a dual space representation. Preferred embodiments for learning SVMs are the dual space SMO (Sequential Minimal Optimization) algorithm disclosed in U.S. Pat. No. 6,327,581, which is incorporated herein by reference. The algorithm described in this patent was modified as follows: Incorporate two threshold parameters $b_{low}$ and $b_{up}$ in to the stopping criteria; Use an α-based-partition (Lagrange-based) in collaboration with rewritten Karush-Kuhn-Tucker violating conditions (this leads to a more efficient selection of the example alphas to update (i.e., unlike the random selection techniques employed by SMO)). Consequently, this leads to two preferred embodiments for learning algorithms: SMOK1 and SMOK2. These embodiments also include facilities for learning soft SVMs, asymmetric SVMs, nonlinear SVMs (addressed presently) and combinations of these.

It will be appreciated by those skilled in the art that SVMs can be extended to provide non-linear separation using nonlinear kernels (or mapping functions) such as polynomial kernels or radial basis kernels.

SVMs performance for modeling information needs, while being competitive with other approaches (e.g., Rocchio, naïve Bayes) from a precision perspective, is not competitive from a recall perspective.

Given that, theoretically, generalization error (the error of model on unseen data) can be upper-bounded as a function of the margin, the distance from the nearest data points to the separating decision surface (hyperplane), SVM learning algorithms focus on finding the model that maximizes the margin. This approach to model selection is entirely data driven and provides state-of-the-art performance in dense data problems. However, in domains such as modeling information needs, that are sparse and where classes are unevenly distributed and poorly represented, this approach to learning can lead to an over fitting of the class with more training data. In the case of modeling information needs, this drastically reduces recall. Several attempts have been made to improve the recall of SVMs while not adversely affecting precision in a text classification context. These were described earlier. All approaches use relaxation strategies that adjust the position or orientation (or both) of the separating hyperplane.

Learning an SVM (presentation limited to linear SVMs but can be extended to nonlinear SVMs) results in list or vector of weighted terms and a threshold value b that is optimal with respect to the margin. As alluded to earlier, this can lead to a very conservative behavior that promotes precision over recall. To overcome this conservative nature, a hyperplane adjustment step, the details of which are disclosed below, is performed. This step focuses on adjusting the threshold component of the SVM hyperplane representation.

A preferred embodiment of the invention uses the hyperplane adjustment strategy, termed discrete thresholding, to adjust the position of the hyperplane by adjusting the threshold. This is disclosed presently. This strategy results in translating the separating hyperplane 210 towards one of the supporting hyperplanes 214 or 213 in a parallel fashion. A hypothetical example of this relaxation process is where the hyperplane 210 is translated by a distance of −1. This results in a new separating hyperplane which happens in this case to coincide with the supporting hyperplane 213. In short, this results in resetting the threshold or bias term of the SVM model (by −1 in this example). This step, known as threshold adjustment is performed after the SVM model has been learned from example data. The discrete thresholding strategy exploits the ranking ability of an SVM model and relies on a utility model and the beta-gamma thresholding strategy. Both of the utility model and the beta-gamma thresholding strategy are described first.

Traditional text classification and filtering systems are binary in nature, in that they make a decision for each document independently of all other documents as to whether it belongs to a given class or not. In most cases, decisions are required as soon as the document arrives, therefore ranked lists are not possible and each decision is made independently. In such systems the degree of satisfaction of a user may be expressed by a utility measure, and consequently, the goal of the classification system is to optimize this measure. Linear utility measures provide an effective and intuitive means of accomplishing this. In the following for purposes of exposition, we describe a particular type of utility function based on specific information-theoretic measures, however, the embodiment of the invention does not depend on the use of any one such specific utility measure. In particular, we recognize that other utility measures may be appropriate that include such considerations as the size of the filter (model) as it is stored in memory, the complexity of the filter (model) in terms of the number of steps, or the processing time it requires to process data, etc., and other such pragmatic measures of the process or combinations of such measures. A preferred embodiment of the invention uses one of several possible linear utility functions. These utility functions take the following form:

$$\text{Utility}=U=aR^{+}+bN^{+}+cR^{-}+dN^{-}$$

where $R^+$ is the count of positive ("relevant") documents in the filtered (delivered) set, $N^+$ is the count of the negative ("non-relevant") documents in the delivered set, $R^-$ is the count of the positive documents that have been missed (not delivered with respect to a database or stream), $N^-$ is the count of the negative documents that have been (correctly) not delivered, and a, b, c, and d are parameters. T10U is one such measure and is defined as follows: $T10U=2R^{+}-N^{+}$. T10U provides a means of modeling a user in an information retrieval setting, whereby, each document with an actual positive label that was accepted by the model M, i.e., each true-positive document, denoted as $R^+$, receives a utility of two points, whereas each negative document that is accepted by the model, i.e., a false-positive document, denoted as $N^+$, receives a utility of minus one.

Empirical results show that optimizing for linear utility, with most of these utilities being asymmetric, leads to boosted performance of traditional information retrieval measures such as recall, precision and Fbeta. Thresholding strongly affects effectiveness, with no single threshold satisfying all utility measures. Consequently, it is critical to incorporate the notion of utility into learning. Incorporating utility models into SVMs can be accomplished heuristically through embedded learning strategies (through asymmetric costs), and more directly through thresholding strategies such as the approaches disclosed here.

The beta-gamma thresholding algorithm can apply in the context of adaptive and batch filtering using traditional information retrieval filters to set the threshold for a filter model. Threshold setting typically requires reference to some model or measure of the user's desired outcome or preferences for filtering. One such measure is the linear utility measure as outlined above. There are many such functions known to practitioners of the art.

Given a labeled dataset of documents and an information need model, for example an SVM, the information need model is used to rank the documents based on margin (similarity) scores. A margin (a distance-based score) is obtained by evaluating each document against the model. A preferred embodiment of an information need is an SVM 200. Using the SVM 200 a margin score is calculated for each example. The margin corresponds to the perpendicular distance (Euclidean distance) from the example to the separating hyperplane 210. For example, the document 230$a$ is a perpendicular distance of 3 (three) 231$a$ to the separating hyperplane 210. In FIG. 2($a$), a set of documents 250$a$ is listed along with their corresponding margin scores (or margins for short) 252$a$ and their corresponding classification labels 253$a$, where a "+" entry denotes that the corresponding document satisfied the information need, and a "−" entry denotes that the corresponding document does not satisfy the information need. The documents 230$a$ are graphically depicted in 270$a$ and their corresponding margins 252$a$ can be easily visualized using the margin axis 271$a$. The documents 230$a$ are ranked in decreasing order of their margins 252$a$. A cumulative utility can be calculated for each rank using a linear utility function as follows: Utility$_{Rank}$=2R$^+$−N$^+$, where R$^+$ represents the number of documents with a positive label "+" up to and including the current rank Rank, and where N$^+$ represents the number of documents with a negative label "−" up to and including the current rank Rank. 254$a$ presents the calculation of the utility at each rank, while 251$a$ presents the cumulative utility at the corresponding rank. The margins 252$a$ can be plotted in curve format as a function of their rank 230$a$ (corresponding to the x-axis or horizontal axis 311) yielding a data margin curve 321. Similarly the cumulative utility values 254$a$ can be plotted in curve format as a function of their rank 230$a$ (corresponding to the x-axis or horizontal axis 311) yielding a data utility curve 320.

Subsequently, we can note the point in the ranking at which the value on the utility curve 320 is greatest 330. This corresponds to a rank value. We denote the rank with utility 330 as $i_{Opt}$ 352. We can also note the point in the ranking 332 at which the cumulative utility curve 320 first reaches 0 (zero) or lower for documents occurring lower in rank than the document occurring at $i_{Opt}$ 352. This also corresponds to a rank. We denote the rank with utility 332 as $i_{Zero}$ 334. Using the ranks $i_{Opt}$ 352 and $i_{Zero}$ 334 two corresponding points on the margin curve 321 can be identified. These corresponding margins are known as the optimal margin, $\theta_{Opt}$ 333 (350), and the zero margin, $\theta_{Zero}$ 334 (351). Empirical studies have shown that the optimal margin (i.e., the threshold value that yields optimal utility on a unseen or held out sample) generally falls in the interval $\theta_{Opt}$ 333 (350), optimal utility margin, and, $\theta_{Zero}$ 334 (351), the zero utility margin. The actual optimal margin (threshold) can be determined by interpolation (or extrapolation) of these interval boundary points.

Using the optimal utility margin $\theta_{Opt}$ 333 (350) and the zero utility margin $\theta_{Zero}$ 334 (351), a new threshold is then calculated by interpolating between the empirical optimal utility margin and the empirical zero utility margin over a thresholding dataset as follows:

$$\text{threshold}=\alpha \cdot \theta_{zero}+(1-\alpha) \cdot \theta_{opt}$$

$$\alpha=\beta+(1-\beta) \cdot e^{p-\gamma}$$

where $\theta_{Opt}$ 333 (350) is the margin on the margin curve at the rank 352, which corresponds to the highest utility point 330 on the utility curve 320

$\theta_{zero}$ 334 (351) is the margin on the margin curve at the rank 334, which corresponds to the zero utility point 332 on the utility curve 320 p is the number positive (or relevant) documents in thresholding dataset and $\alpha$, $\beta$, $\gamma$ are parameters.

Previously, the degree of interpolation (i.e., the values of the $\beta$, $\gamma$ parameters) was empirically determined using experience on other problem domains. Below we disclose various means of automatically calculating the degree of interpolation (or extrapolation).

Figure 3:
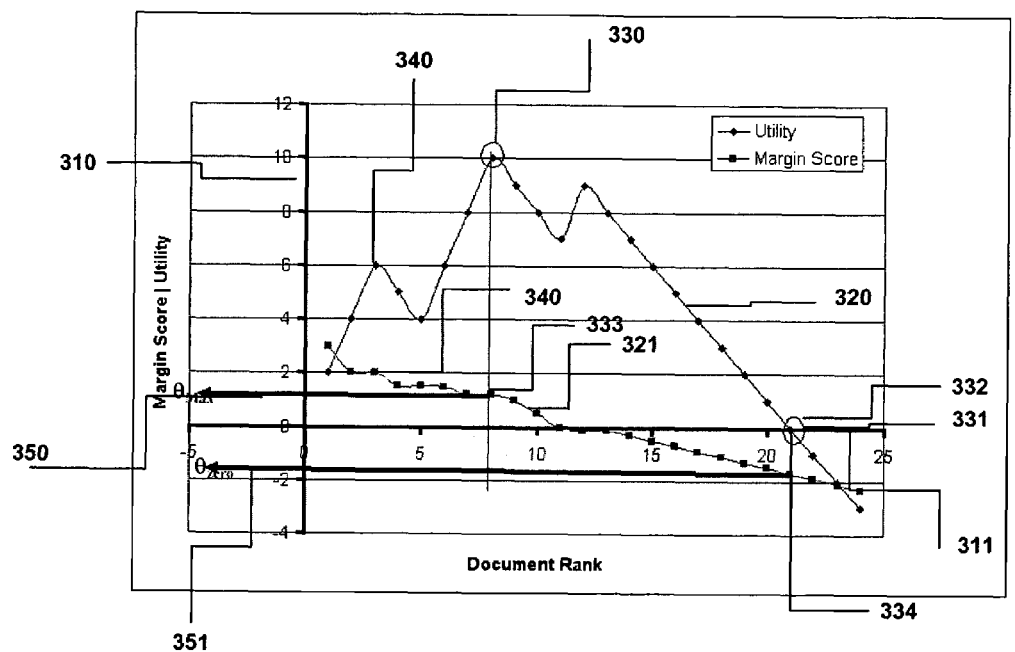
FIG. 3 is a graph of a ranked list of documents with corresponding margin score and utility curves.
Figure 3A:
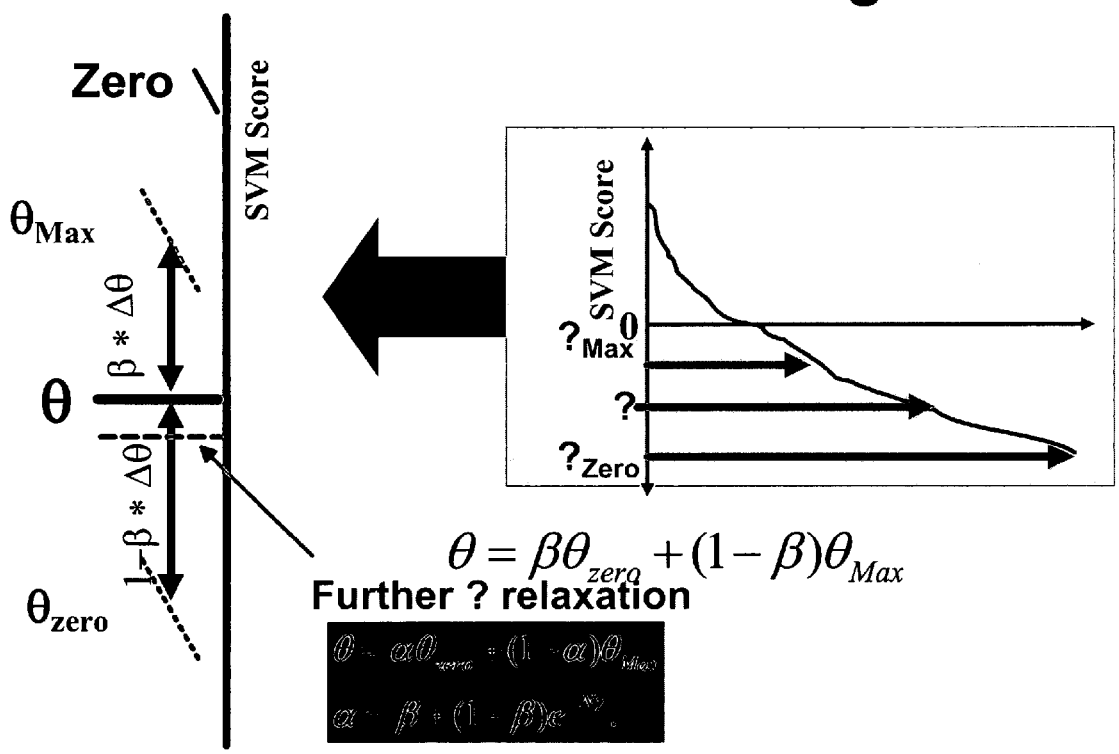
FIG. 3a is a graph that illustrates the parameters of the beta-gamma thresholding algorithm.
Figure 3B:
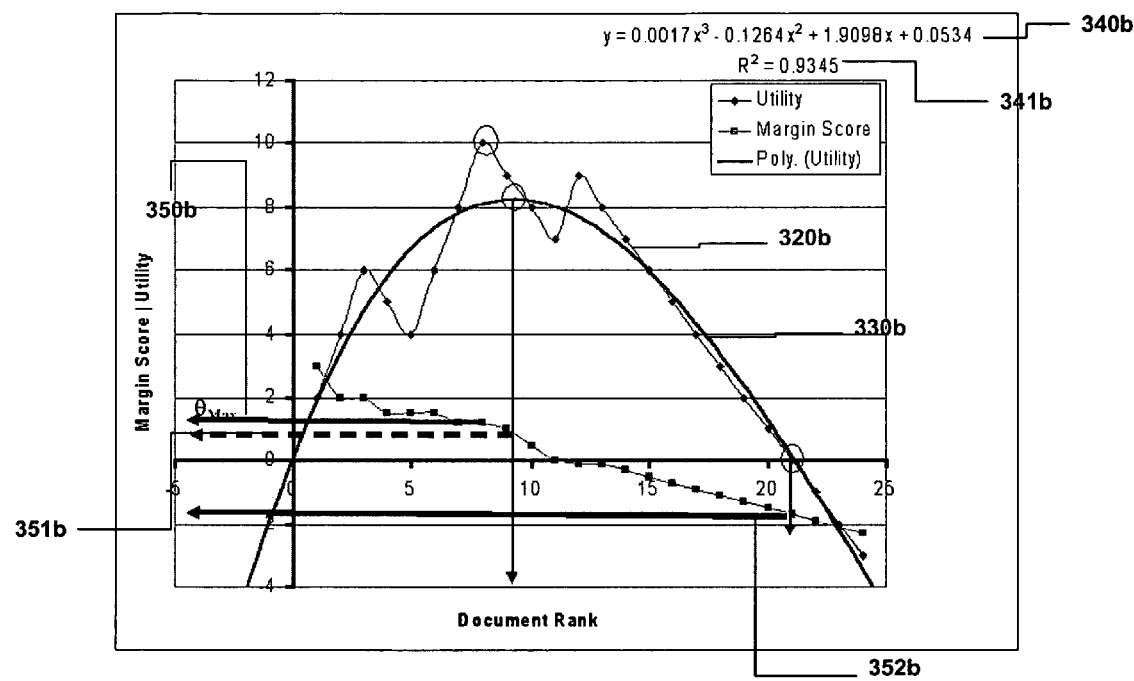
FIG. 3b is a graph of a ranked list of documents with corresponding margin score, utility, and fitted utility curves.

This method of setting the threshold is referred to as the beta-gamma thresholding algorithm (or "beta-gamma" method) in the following. The parameters of this algorithm are illustrated schematically in FIG. 3$a$. This algorithm and its background are described in greater detail in U.S. Pat. Nos. 6,430,559, 6,463,434, 6,535,876, and 6,587,850, which are herein incorporated by reference.

The beta-gamma procedure SetThresholdUsingBetaGamma, given in pseudo-code descriptive form below, requires the following as input: an information need or category label, C; a labeled dataset, T, of documents consisting of both positive and negative examples of C; a learnt model (e.g., an information need model), M, that models the category C; $\beta$, and $\gamma$ the threshold adjustment parameters; a utility measure UtililtyMeasure; and p, the number positive (or relevant) documents in thresholding dataset T:

SetThresholdUsingBetaGamma(C, T, M, $\beta$, UtililtyMeasure, p)

1. Rank the thresholding dataset, T, using the model, M, as a ranking function, thereby yielding a ranked document list R consisting of tuples <Document$_i$, Score$_i$>, i.e., in decreasing order of document score, Score$_i$.
2. Generate the corresponding score curve as function of the rank.
3. Generate the cumulative utility curve for R as a function of the rank, i.e., for each document in the ranked list R compute the cumulative utility using the utility measure UtililtyMeasure.
4. Determine the rank of the maximum utility point on the cumulative curve and the rank of the first zero utility point following the maximum utility point. Denote these as $i_{Opt}$, and $i_{Zero}$ respectively.
5. Assign the variables $\theta_{Opt}$ and $\theta_{Zero}$ the scores on the score curve corresponding to the ranks $i_{Opt}$, and $i_{Zero}$ respectively. If $\beta$=void exit and return $\theta_{Opt}$ and $\theta_{Zero}$.
6. Return the threshold, □ which is calculated as follows:

$$\theta=\alpha \theta_{zero}+(1-\alpha)\theta_{Opt}$$

$$\alpha=\beta+(1-\beta)e^{-p\gamma}$$

In previous embodiments of the beta-gamma thresholding algorithm the interval boundary values, the optimal utility margin $\theta_{opt}$ 333 (350), and the zero utility margin, $\theta_{Zero}$ 334 (351) (which are used to calculate the threshold value of the model) were determined using the utility curve and margin curve that were derived directly from a provided dataset. Calculations based on these curves can be vulnerable to erratic data values (non-smooth) and therefore lead to threshold values that are either too conservative or too liberal.

In an alternative embodiment of the beta-gamma thresholding algorithm, alternative curve representations of the utility and margin curves can be used to derive the interval boundary values. These alternative curve representations can be achieved by smoothing or fitting algorithms. The resulting smoothed or fitted curves are less vulnerable to local idiosyncrasies of the data. In one alternative embodiment, the utility data curve is replaced with a fitted utility curve if the fit is determined to be a good fit. The fitted utility curve could be calculated using any of variety of well known techniques from statistics or machine learning. For example, a polynomial curve could be calculated using the least squares fit through the points on the data utility curve 251*a* by using the following equation:

$$\text{Utility}_{rank} = b + c_1 \cdot \text{rank}^1 + c_2 \cdot \text{rank}^2 \ldots + c_n \cdot \text{rank}^n$$

where b and $c_1 \ldots c_n$ are constants that are determined by the curve fitting algorithm and n is the degree of or order of the polynomial and rank is a variable. Higher values of n will lead to a curve that more closely approximates the original data curve. The data utility curve 320(*b*) for the example dataset 260*a* can be approximated by a polynomial curve of degree 3 (three) 330*b*. The equation of the corresponding data curve is given in 340*b* and the sum of the square of the error between each data point and the curve is given in 341*b*. If this error is too large then the original data curve can be used or alternatively a higher order of polynomial could be fitted and used. Subsequently, the calculation of the interval boundary values $\theta_{opt}$ 333 (350) and $\theta_{Zero}$ 334 (351) in the beta-gamma procedure is as presented above, where the data utility curve is replaced with a fitted utility curve. Notice how $\theta_{opt}$ 350*b* (350), which is calculated using the original data utility curve, differs from $\theta_{opt}$ 351*b*, which is calculated using the fitted utility curve. $\theta_{Zero}$ 352*b*, in this example, coincides in both cases to the same value.

Figure 3C:
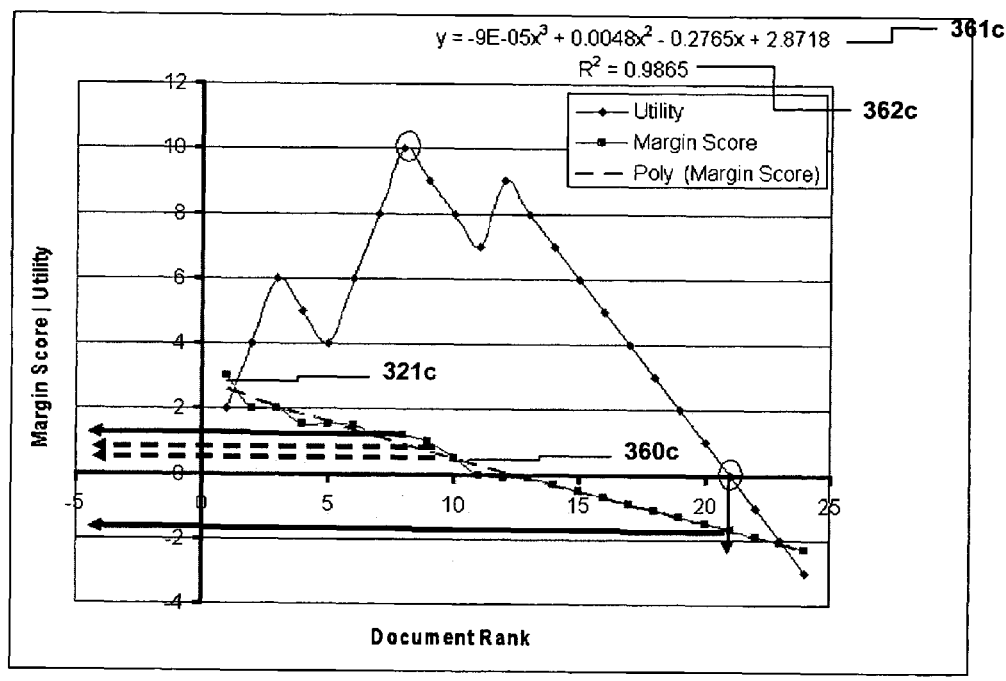
FIG. 3c is a graph of a ranked list of documents with corresponding margin score, utility, and fitted margin curves.

In an alternative embodiment, the data-based margin score curve 321*c* of the beta-gamma thresholding algorithm is replaced with a fitted curve 360*c*. Once again the fitted curve is less vulnerable to local idiosyncrasies of the data. Any of a variety of curves can be used. Subsequently, the calculation of the interval boundary values $\theta_{opt}$ 333 (350), and the zero margin, $\theta_{Zero}$ 334 (351) in the beta-gamma procedure is as presented above, where the score curve is replaced with a fitted score curve. In FIG. 3*c*, the margin curve 320*c* (320) has been fitted with a polynomial curve of degree 3 (three) 360*c*. The equation for this curve is 361*c* and the sum of the squared error is 362*c*.

Figure 3D:
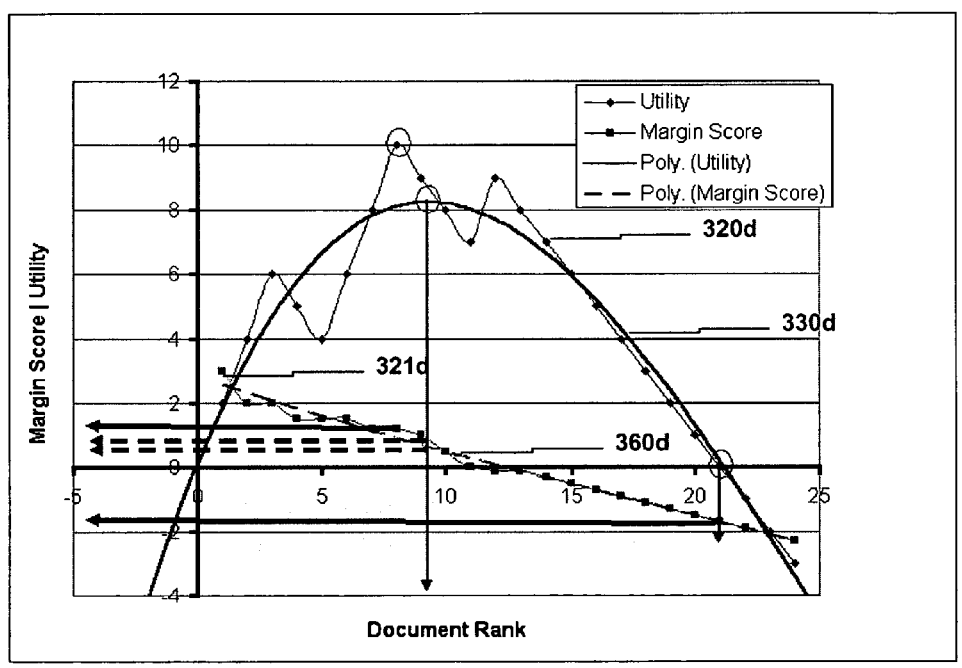
FIG. 3d is a graph of a ranked list of documents with corresponding margin score, utility, fitted margin curves, and fitted utility curves.

In an alternative embodiment, both the data utility curve and the margin utility curve are replaced with their corresponding fitted versions and calculation of the new threshold is carried out using the beta-gamma thresholding algorithm outlined above in conjunction with the fitted margin and utility curves. This is graphically demonstrated in FIG. 3*d*.

Practitioners of the art can readily appreciate the many alternative strategies and techniques one might use to derive alternative curves (using fitting or smoothing strategies).

In the preferred embodiment for determining the amount that the threshold should be adjusted, the values of $\beta$, $\gamma$ are determined automatically using a procedure based upon n-fold cross validation. This embodiment is known as the discrete threshold adjustment algorithm.

The principal novelty of this approach is that we adapt cross validation to optimize the parameters of the beta-gamma algorithm empirically. The user provides possible values of $\beta$ and $\gamma$ from which an optimal combination is selected using cross fold validation over the training dataset.

The discrete threshold adjustment algorithm consists of the following steps and uses as input a category label, C (e.g., +1), a labeled dataset, T, of documents consisting of both positive and negative examples of C (for example, T could be a subset or the complete training dataset), a learnt model, M, that models the category C, $\beta$, the threshold adjustment parameter, UtilityMeasure, a utility measure that models the user's expectations, $\beta$s (valid values for $\beta$ are positive or negative real numbers), the set of possible beta values, $\gamma$s, the set of possible gamma values, and n, the number of folds that will be used in parameter selection:

DiscreteThreshold(C, T M, UtililtyMeasure, $\beta$s, $\gamma$s, n)
1. Partition the data into n non-overlapping subsets of the data ensuring that both positive and negative documents are present in each fold or subset. In particular, if P denotes the number of positive documents in T, then each fold is forced to have approximately P/n positive documents.
2. Foreach each combination of $\beta$ and $\gamma$ values in $\beta$s and $\gamma$s do
3. Utility$_{\beta\gamma}$=0
4. Foreach fold/subset n do
   Set $T_n$ to the n−1 folds (i.e., all subsets besides except subset n).
   Set $\theta$=SetThresholdUsingBetaGamma(C, $T_n$, M, $\beta$, $\gamma$, UtililtyMeasure, $P_{T_n}$)
   Utility$_{\beta\gamma n}$=Calculate the utility for M and the threshold, $\theta$, over the fold n.
   Utility$_{\beta\gamma}$=Utility$_{\Theta\gamma}$+Utility$_{\beta\gamma n}$
5. End Foreach
6. Compute the average utility as follows: Utility$_{\beta\gamma}$=Utility$_{\beta\gamma}$/n
7. End Foreach
8. Calculate the optimal threshold, $\theta_{new}$, using the $\beta$ and $\gamma$ combination that has the highest average utility Utility$_{\beta\gamma}$ as follows: SetSVMThresholdUsingBetaGamma(C, T, M, $\beta$, $\gamma$, UtililtyMeasure, $P_T$)
9. Return $\theta_{new}$.

In the above algorithm, $P_X$ denotes the number of positive examples in the database X The returned value or output of DiscreteThreshold(.) is used in document classification as follows:

$$\text{Class}(X) = \text{Sign}(\langle W, X \rangle + b - \theta_{new})$$

The modified classification rule for nonlinear SVMs is as follows:

$$\text{Class}(X) = \text{Sign}\left(\sum_{i=1}^{|SV|} \alpha_i y_i K\langle X, X_i \rangle + b - \theta_{new}\right)$$

where K(.) denotes a similarity function such as dot product.

Figure 4:
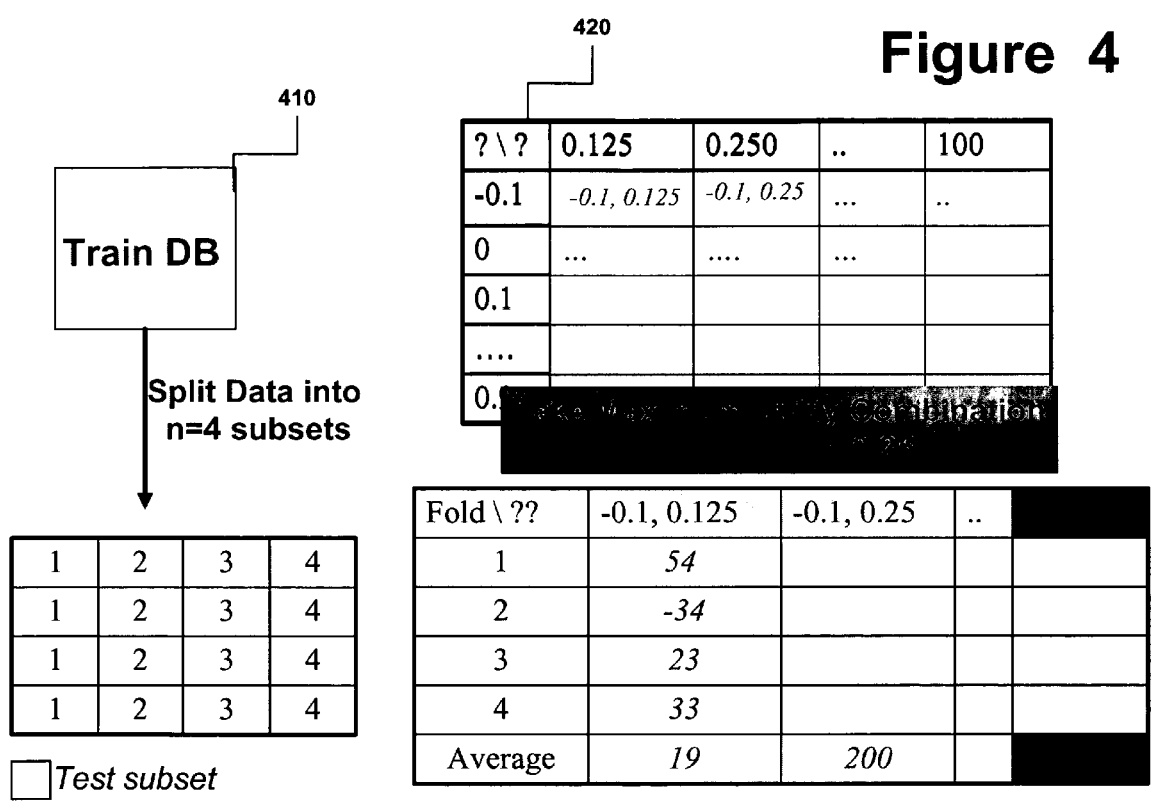
FIG. 4 is a schematic of the discrete thresholding algorithm.
Figure 4A:
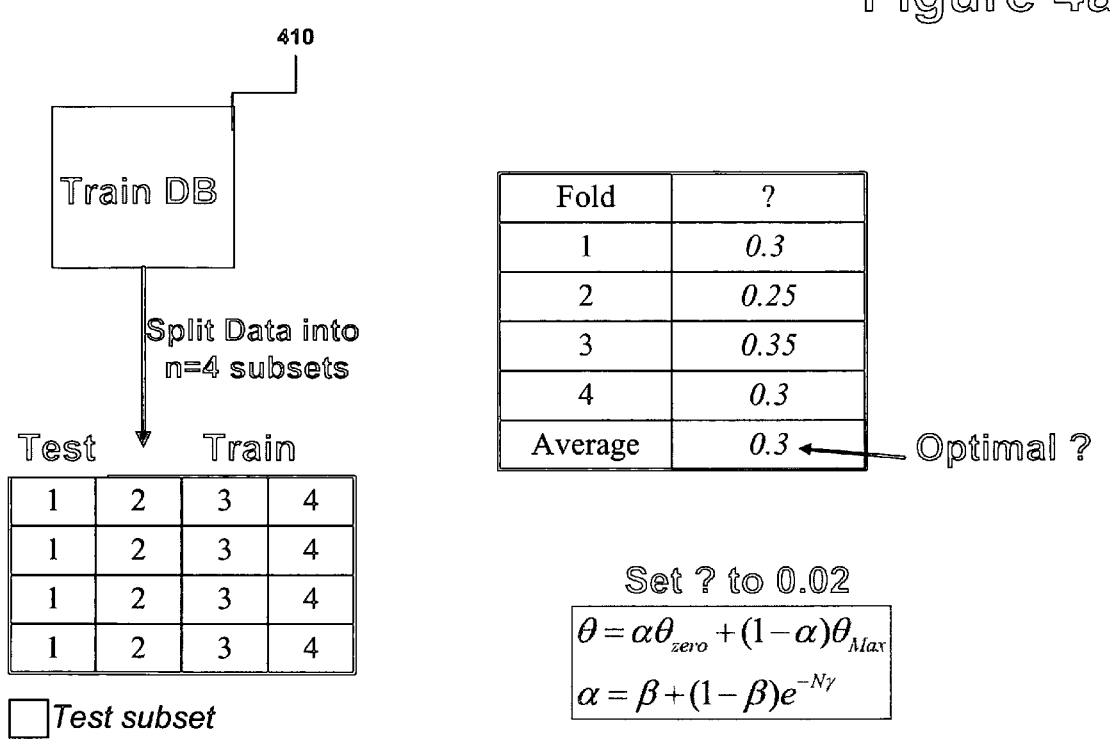
FIG. 4a is a schematic of the continuous thresholding algorithm.

FIG. 4 is a schematic of the discrete thresholding algorithm, where the number of folds is set to 4 (i.e., the training dataset 410 is partitioned into 4 non-overlapping subsets). Here, in this example, various values of beta and gamma ($\beta$, $\gamma$) 420 are explored before final values for $\beta$, $\gamma$ of 0.1, 0.125 respectively are determined as optimal.

In an alternative embodiment the values of β, γ are determined automatically using a procedure based upon a combination of retrofitting and cross validation. This embodiment is known as the continuous threshold adjustment procedure.

The principal novelty of this approach is that we adapt a combination of retrofitting and cross validation to optimize the parameters of the beta-gamma algorithm empirically, thereby rendering the approach parameter free (i.e., the user does not have to specify thresholding parameters). The beta parameter is determined as follows, assuming the training data has been split into n folds/subsets: For each fold determine a beta value $β_n$ using the following steps. Determine $θ_{Max}$ and $θ_{Zero}$ using the beta-gamma algorithm (outlined above) from the n−1 remaining folds. On the other held-out fold, n, determine the optimal utility point and simply calculate the value of $β_n$ that leads to the score corresponding to this optimal utility on the held-out fold based upon the interval $θ_{Max}$ and $θ_{Zero}$. Set β to the average of the beta values for each fold. This beta value is the critical parameter to threshold relaxation, while γ is more stable across topics and corpora and is set heuristically. A useful setting for γ is 0.02. γ could be determined through a cross validation step that is performed subsequent to the beta step or in parallel.

The continuous threshold adjustment procedure consists of the following steps and uses the following as input: a category label, C; a labeled dataset, T, of documents consisting of both positive and negative examples of C; a learnt model, M, that models the category C; UtililtyMeasure, a utility measure that models the user, such as, T10U; and n, the number of folds that will be used in parameter selection.

ContinuousThreshold(C, T, M, UtililtyMeasure, n)
1. Partition the data T into n non-overlapping subsets of the data ensuring that both positive and negative documents are present in each fold or subset. In particular, if P denotes the number of positive documents in T, then each fold is forced to have approximately P/n positive documents.
2. $β_{sum}=0$
3. Foreach fold/subset n
    1.1. Set $T_n$ to the remaining n−1 folds (i.e., all fold besides except fold n).
    1.2. Call SetThresholdUsingBetaGamma(C, $T_n$, M, void, void, UtililtyMeasure, $P_{Tn}$) and assign the variables $θ_{Opt}$ and $θ_{zero}$ the corresponding values in Step 5 of the SetThresholdUsingBetaGamma routine.
    1.3. Rank the documents in the held-out fold n using model M and generate the cumulative utility curve for this ranked list R, i.e., for each document in the ranked list R compute the cumulative utility using the utility measure UtililtyMeasure.
    1.4. Determine the rank of the maximum utility point on the cumulative utility curve, denoted as $i_{Max}$.
    1.5. Assign the variable $θ_n$ the output score on the score curve corresponding to the rank $i_{Max}$.
    1.6. Retrofit $β_n$ as follows:

$$β_n = \frac{θ_n - θ_{Opt}}{θ_{Zero} - θ_{Opt}} \quad (9)$$

1.7. $β_{sum}=β_{sum}+β_n$

4. End Foreach
5. Set β to the average over the βs determined for each fold as follows: $β=β_{sum}/n$
6. Calculate the optimal threshold, $θ_{new}$, using β (that was determined using the previous steps) as follows: SetThresholdUsingBetaGamma(C, T, M, β, γ, UtililtyMeasure, $P_T$)
7. Return $θ_{new}$.

In the above algorithm, $P_X$ denotes the number of positive examples in the database X The returned value or output of ContinuousThreshold(.) is used in document classification as follows:

$$Class(X)=Sign(⟨W,X⟩+b-θ_{new}) \quad (10)$$

The modified classification rule for nonlinear SVMs is as follows:

$$Class(X) = Sign\left(\sum_{i=1}^{|SV|} α_i y_i K(X, X_i) + b - θ_{new}\right)$$

where K(.) denotes a similarity function such as dot product.

FIG. 4b is a schematic of the continuous thresholding algorithm, where the number of folds is set to 4 (i.e., the training date set 410 is partitioned into 4 non-overlapping subsets). A different value of beta (β) is determined for each fold, which are subsequently averaged leading an optimal value of 0.3 for β. The value for γ was fixed at 0.02 in this case.

In the above embodiment, the underlying model of an information need was an SVM model. Here an alternative preferred embodiment is outlined, where the underlying model of the information need is a traditional information retrieval (IR) vector space model. An information retrieval model can be represented as a pair of parameters <W, θ>, where W denotes a weight vector and θ represents a threshold. The weight vector W consists of a list of tuples of the form <$f_i$, $w_i$>, where $f_i$ denotes a feature and $w_i$ denotes the weight associated with feature $f_i$. This corresponds to a vector space representation of the weight vector W. The weight values $w_i$ and threshold θ are learned from examples using information retrieval learning algorithms. These algorithms involves the steps of feature extraction from example documents, feature weighting, and threshold setting, with reference to a scoring function for the features (typically a dot product-based function) and a utility function. The scoring function determines the score (the similarity) of a document based on the features of the document that are shared with the features in the model. The utility function, as described earlier, gives the relative value of delivered documents that are correctly classified (the "true positives") to delivered documents that are incorrectly classified (the "false positives"), as determined by or for the user. The threshold is the score such that documents scoring at or above threshold are accepted by the system. The threshold is ideally set to a score that maximizes expected utility.

The features or terms that are used in the IR model are derived from example documents and other text that the user or system has provided as a characterization of the topic or category to be filtered. In one embodiment of the invention, the terms in the IR model are extracted from the positive and negative examples (and other background text), in a two-step process that involves first identifying the features in the text and second selecting a subset of the possible features according to a selection principle. For each document terms are extracted using techniques that were described above. Weights are then calculated for each feature using a weighting function such as TF_IDF. Subsequently, terms are selected that will be used in the information need model. Many possible term-selection functions can be used and are known to practitioners of the art. In one preferred embodiment, the following scoring function, derived from the familiar "Rocchio" scoring approach could be used to ranks the terms. The Rocchio weighting approach is defined as follows:

$$Rocchio_i = TF_{i,Text} + \alpha \left( \frac{1}{R} \sum_{Dj \in D_R \& w_i \in D_i} TF_{ij} \right) - \beta \left( \frac{1}{N} \sum_{Dj \in D_N \& w_i \in D_i} TF_{ij} \right)$$

Where $TF_{i,Text}$: The frequency of feature $f_i$ in the text description of the information need $TF_{ij}$: The number of occurences of feature$_i$ in document j $D_R$: Positive document set $D_N$: Negative document set R: the number of positive documents (i.e., the size of $D_R$)

N: the number of negative documents $\alpha, \beta$: coefficients that must be determined experimentally ($\alpha$ is often set to 0.75, and $\beta$ is often set to 0.25)

Once scores have been assigned to features, using in this case a Rocchio function, the features can be ranked and all or a subset of the features can be chosen for use in the IR-based model of the information need. In a preferred embodiment of the invention, features from example documents are chosen in descending order of score down to a rank (e.g., 10, 20, or 50) that is specified by the algorithm used in filter construction and just those top-ranked terms are used for the feature profile.

The weights associated with each term in the IR model can be a product of Rocchio weights (in this example) and TD_IDF.

$$w_i = Rocchio_i \cdot idf_i$$

where $Rocchio_i$ is as defined above and $idf_i$ represents the log of the inverse of the distribution count of $f_i$, across all the available units (e.g., documents) that have been processed.

The model threshold $\theta$ (where documents scoring above this value will be classified as positive) can be established using the discrete thresholding procedure or the continuous thresholding procedure outlined above.

Classification using an IR model (W, $\theta$), represented in terms of its weight vector W, and its threshold $\theta$, of a document X is accomplished using the following decision rule:

$$Class(X) = \begin{cases} +1 & \text{if}(\langle W, X \rangle \geq \theta) \\ -1 & \text{Otherwise} \end{cases}$$

where <.> denotes the dot product operation and W and $\theta$ are the parameters of the IR model.

Practitioners of the art can readily appreciate the many alternative strategies and techniques one might use to construct a model (for example, probabilistic models) and for which the above outlined thresholding procedures could be used to adjust or set the threshold. In addition the preferred embodiments can be applied to not only modeling information needs but all to other problem domains such as face classification.

In many filtering applications a filter or classifier cannot remain static, but must be modified, recreated, or re-learnt based on new conditions (e.g., data and user preferences) that arise over time. A news filter, for example, may work well when a particular story of interest is first reported, but may over-deliver articles when the story becomes older or familiar. This can happen both because the user's interest changes—from wanting all the news on the story to wanting only significant new developments in the story, for example—and also because the information in the articles (including new words or names, abbreviations, patterns of phrases, etc.) changes over time and the features in the original filter no longer serve as effective discriminators. A critical requirement of an adaptive filtering system is the ability to receive feedback from the user and to interpret the feedback, perhaps along with information the filter has previously delivered to the user, to revise the filter and (going forward in time) deliver information that conforms to the changed conditions of the texts that are being processed and the shifted interests of the user. In such cases, we need a more complex model of the system and its relation to the user, as given in FIG. 1a. In particular, FIG. 1a presents an adaptive filtering system with user interface elements 107a—the interface for presenting results of filtering to the user; and 108a—an interactive interface element allowing the user to render judgment on whether the filtering decision was correct. The feedback may be implicit (for instance, documents delivered to the user as relevant, and not marked by the user as irrelevant can be presumed relevant). The new documents together with their class assignment are then applied in 110a to the class model in order to improve its performance.

The disclosed method of threshold setting and adjustment can be applied to adaptive filter models through a process of incremental updating based on user responses to the delivered information, as follows.

The adaptive filtering of a stream of documents involves the following steps:

1. Creating the model M, using a learning algorithm (SVM) and some initial set of known examples for the model.

2. Filtering a certain amount of documents that are to be classified. The user of the system renders judgments on the delivered documents in this scenario (either explicitly by indicating the class of the document or implicitly by not giving a class, in which case the document is assumed to be positive), thus increasing the pool of judged examples can be used for updating the information need model.

3. At certain intervals (for example, every time a new positive example appears), the model M, is updated using the expanded list of judged (and un-judged) documents as follows:

Update the SVM model by retraining.

Update the threshold of the information model using DiscreteThreshold or Continuous Threshold.

This thresholding pass incorporates newly acquired training information thus dynamically improving the filter.

4. Go back to step 2 unless user requests filtering be concluded.

Figure 5:
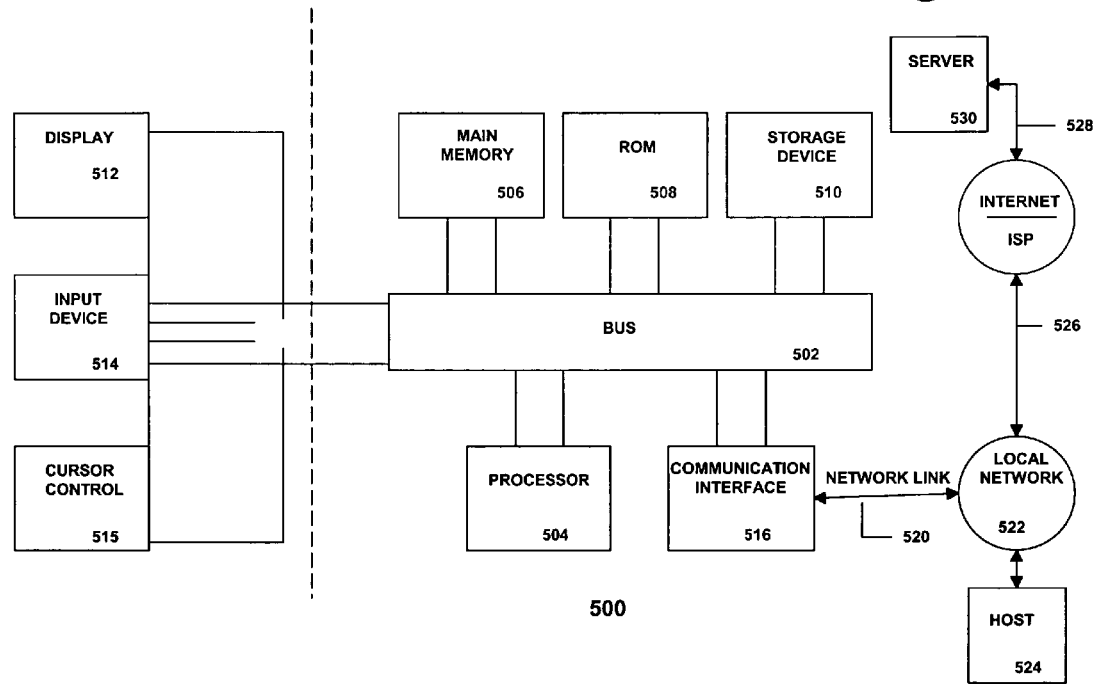
FIG. 5 is a block diagram of a computer system on which embodiments of the invention may be implemented.

FIG. 5 is a block diagram which illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), which allows the device to specify positions in a plane.

The invention is related to the use of computer system 500 for filtering documents. The filtering process is provided by system 500 in response to processor 504 executing sequences of instructions contained in main memory 506. Such instructions may be read into main memory 506 from another computer-readable medium, such as storage device 1310. However, the computer-readable medium is not limited to devices such as storage device 510. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 506 causes processor 504 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet 528 for example, a server 530 might transmit a requested code for an application program through Internet 528, ISP 526, local network 522 and communication interface 518. In accordance with the invention, one such downloaded application provides for the retrieval or filtering of information using chunks of text as described herein. Program code received over a network may be executed by processor 504 as it is received, and/or stored in storage device 510, or other non-volatile storage for later execution. In this manner, computer system 500 may obtain application code in the form of a carrier wave.

Components of the invention may be stored in memory or on disks in a plurality of locations in whole or in part and may be accessed synchronously or asynchronously by an application and, if in constituent form, reconstituted in memory to provide the information required for retrieval or filtering of documents.

While this invention has been particularly described and illustrated with reference to particular embodiments thereof, it will be understood by those skilled in the art that changes in the above description or illustrations may be made with respect to form or detail without departing from the spirit or scope of the invention.

The invention claimed is:

1. A method for modeling an information request, comprising:
  receiving unlabeled and labeled documents;
  extracting a set of features from each document;
  learning a model from example documents marked as positive or negative with respect to said request wherein said model scores documents to evaluate a degree of membership in a group responsive to said request;
  evaluating the performance of model settings on example documents;
  applying an adjustment algorithm that provides a threshold value $\theta_{new}$;
  applying a scoring function that computes a score, which is a value assigned to a document by the learnt model; and the document classifying based on the following equation:

$$\text{Class}(X) = \text{Sign}(\text{score} - \theta_{new})$$

wherein $\theta_{new}$ is said threshold value, score is said value assigned to the document by the learnt model sign is a function that returns a sign value based upon a value of score minus $\theta_{new}$, and Class(X) is a classification of the document assigned by the Sign function.

2. The method according to claim 1, wherein:
  said model is a support vector machine determined by training data from labeled example documents.

3. The method according to claim 1, wherein:
  said model comprises a list of terms and weights extracted from labeled example documents.

4. The method according to claim 1, wherein:
said model comprises a list of terms and corresponding weights and a threshold value determined by:
extracting terms and features from the positive and negative documents;
ranking terms and features;
selecting a subset of terms and features from the ranked terms and features;
assigning a weight $w_i$ for each term and feature;
setting a threshold $\theta$ for the model to zero.

5. The method according to claim 4, wherein:
said terms and features are ranked in decreasing order of their Rocchio score calculated as follows:

$$Rocchio_i = TF_{i,Text} + \alpha\left(\frac{1}{R}\sum_{Dj \in D_R \& w_i \in D_i} TF_{ij}\right) - \beta\left(\frac{1}{N}\sum_{Dj \in D_N \& w_i \in D_i} TF_{ij}\right)$$

in which
$TF_{i,Text}$: The frequency of feature in the text description of the information need
$TF_{ij}$: The number of occurences of feature in document j
$D_R$: Positive document set
$D_N$: Negative document set
R: the number of positive documents (i.e., the size of $D_R$)
N: the number of negative documents.

6. The method according to claim 4, wherein:
said terms and features are assigned a weight as follows:
$w_i = Rocchio_i \cdot idf_i$, calculated as:

$$Rocchio_i = TF_{i,Text} + \alpha\left(\frac{1}{R}\sum_{Dj \in D_R \& w_i \in D_i} TF_{ij}\right) - \beta\left(\frac{1}{N}\sum_{Dj \in D_N \& w_i \in D_i} TF_{ij}\right)$$

where
$TF_{i,Text}$: The frequency of feature in the text description of the information need
$TF_{ij}$: The number of occurences of feature in document j
$D_R$: Positive document set
$D_N$: Negative document set
R: the number of positive documents (i.e., the size of DR)
N: the number of negative documents
and $idf_i$ is calculated as follows:

$idf_i = \log_2(S/n_i) + 1$ where S is the count of documents in the set and $n_i$ is the count of the documents in which $i^{th}$ feature occurs.

7. A system for filtering documents, comprising:
a computer coupled to a network wherein said computer receives documents over said network and transmits documents to an individual user over said network, wherein said computer; is configured to execute steps comprising:
receiving unlabeled and labeled documents;
extracting a set of features from each document;
learning a model from the example documents marked as positive or negative with respect to a category wherein said model scores documents to evaluate a degree of membership in said category;
evaluating the performance of model settings on example documents;
applying an adjustment algorithm that provides a threshold value $\theta_{new}$;
applying a scoring function that computes a score, which is a value assigned to a document by the learnt model; and the classifying document based on the following equation:

$Class(X) = Sign(score - \theta_{new})$ wherein $\theta_{new}$ new is said threshold value, score is said value assigned to the document by the learnt model. Sign is a function that returns a sign value based upon a value of score minus $\theta_{new}$, and Class(X) is a classification of the document assigned by the Sign function.

8. A system as in claim 7, wherein:
said model is a support vector machine determined by training data from labeled example documents.

9. A system as in claim 7, wherein:
said model comprises a list of terms and weights extracted from labeled example documents.

10. The system of claim 7, wherein:
said model comprises a list of terms and corresponding weights and a threshold value determined by:
extracting terms and features from the positive and negative documents;
ranking terms and features;
selecting a subset of terms and features from the ranked terms and features;
assigning a weight $w_i$ for each term and feature;
setting a threshold $\theta$ for the model to zero.

11. The system of claim 10, wherein:
said terms and features are ranked in decreasing order of their Rocchio score calculated as follows:

$$Rocchio_i = TF_{i,Text} + \alpha\left(\frac{1}{R}\sum_{Dj \in D_R \& w_i \in D_i} TF_{ij}\right) - \beta\left(\frac{1}{N}\sum_{Dj \in D_N \& w_i \in D_i} TF_{ij}\right)$$

in which
$TF_{i,Text}$: The frequency of feature in the text description of the information need
$TF_{ij}$: The number of occurences of feature in document j
$D_R$: Positive document set
$D_N$: Negative document set
R: the number of positive documents (i.e., the size of $D_R$)
N: the number of negative documents.

12. The system of claim 10, wherein:
said terms and features are assigned a weight as follows:
$w_i = Rocchio_i \cdot idf_i$, calculated as:

$$Rocchio_i = TF_{i,Text} + \alpha\left(\frac{1}{R}\sum_{Dj \in D_R \& w_i \in D_i} TF_{ij}\right) - \beta\left(\frac{1}{N}\sum_{Dj \in D_N \& w_i \in D_i} TF_{ij}\right)$$

where
$TF_{i,Text}$: The frequency of feature in the text description of the information need
$TF_{ij}$: The number of occurences of feature in document j
$D_R$: Positive document set
$D_N$: Negative document set
R: the number of positive documents (i.e., the size of $D_R$)
N: the number of negative documents
and $idf_i$ is calculated as follows:

$idf_i = \log_2(N/n_i) + 1$ where N is the count of documents in the set and $n_i$ is the count of the documents in which $i^{th}$ feature occurs.

13. A method for retrieving information in response to a request, comprising:
   receiving unlabeled and labeled documents;
   extracting a set of features from each document;
   learning a model from example documents marked as positive or negative with respect to said request wherein said model scores documents to evaluate a degree of membership in a group responsive to said request;
   evaluating the performance of model settings on example documents;
   applying an adjustment algorithm that provides a threshold value $\theta_{new}$;
   applying a scoring function that computes a score, which is a value assigned to a document by the learnt model; and the document classifying based on the sign of the following equation:

$$Class(X) = Sign(score - \theta_{new})$$

wherein $\theta_{new}$ is said threshold value, score is said value assigned to the document by the learnt model. Sign is a function that returns a sign value based upon a value of score minus $\theta_{new}$, and Class(X) is a classification of the document assigned by the Sign function.

14. The method according to claim 13, wherein:
said model is a support vector machine determined by training data from labeled example documents.

15. The method according to claim 13, wherein:
said model comprises a list of terms and weights extracted from labeled example documents.

16. The method according to claim 13, wherein:
said model comprises a list of terms and corresponding weights and a threshold value determined by:
   extracting terms and features from the positive and negative documents;
   ranking terms and features;
   selecting a subset of terms and features from the ranked terms and features;
   assigning a weight $w_i$ for each term and feature;
   setting a threshold $\theta$ for the model to zero.

17. The method according to claim 16, wherein:
said terms and features are ranked in decreasing order of their Rocchio score calculated as follows:

$$Rocchio_i = TF_{i,Text} + \alpha \left( \frac{1}{R} \sum_{Dj \in D_R \& w_i \in D_j} TF_{ij} \right) - \beta \left( \frac{1}{N} \sum_{Dj \in D_N \& w_i \in D_j} TF_{ij} \right)$$

in which
   $TF_{i,Text}$: The frequency of feature in the text description of the information need
   $TF_{ij}$: The number of occurences of feature in document j
   $D_R$: Positive document set
   $D_N$: Negative document set
   R: the number of positive documents (i.e., the size of $D_R$)
   N: the number of negative documents.

18. The method according to claim 16, wherein:
said terms and features are assigned a weight as follows:
$w_i = Rocchio_i \cdot idf_i$, calculated as:

$$Rocchio_i = TF_{i,Text} + \alpha \left( \frac{1}{R} \sum_{Dj \in D_R \& w_i \in D_j} TF_{ij} \right) - \beta \left( \frac{1}{N} \sum_{Dj \in D_N \& w_i \in D_j} TF_{ij} \right)$$

where
   $TF_{i,Text}$: The frequency of feature in the text description of the information need
   $TF_{ij}$: The number of occurences of feature in document j
   $D_R$: Positive document set
   $D_N$: Negative document set
   R: the number of positive documents (i.e., the size of $D_R$)
   N: the number of negative documents
and $idf_i$ is calculated as follows:
   $idf_i = \log_2(S/n_i) + 1$ where S is the count of documents in the set and $n_i$ is the count of the documents in which $i^{th}$ feature occurs.

* * * * *